(12) United States Patent
Zhu et al.

(10) Patent No.: US 11,297,587 B2
(45) Date of Patent: Apr. 5, 2022

(54) NETWORK ACCESS METHOD AND RELATED APPARATUS

(71) Applicant: Huawei Technologies Co., Ltd., Shenzhen (CN)

(72) Inventors: Hualin Zhu, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/993,517

(22) Filed: Aug. 14, 2020

(65) Prior Publication Data
US 2020/0374827 A1 Nov. 26, 2020

Related U.S. Application Data

(63) Continuation of application No. PCT/CN2019/073366, filed on Jan. 28, 2019.

(30) Foreign Application Priority Data

Feb. 14, 2018 (CN) .......................... 201810153155.7

(51) Int. Cl.
*H04W 60/00* (2009.01)
*H04W 76/10* (2018.01)
*H04W 48/02* (2009.01)

(52) U.S. Cl.
CPC ........... *H04W 60/00* (2013.01); *H04W 48/02* (2013.01); *H04W 76/10* (2018.02)

(58) Field of Classification Search
CPC ..... H04W 60/00; H04W 76/10; H04W 48/02; H04W 8/18; H04W 36/0061; H04W 4/021; H04W 48/04; H04W 48/16
(Continued)

(56) References Cited

U.S. PATENT DOCUMENTS 6,999,767 B1 2/2006 Jeong
10,506,651 B2 * 12/2019 Masini .................. H04W 16/32
(Continued)

FOREIGN PATENT DOCUMENTS

CN 101582769 A 11/2009
CN 102264117 A 11/2011
(Continued)

OTHER PUBLICATIONS

"3rd Generation Partnership Project; Technical Specification Group Services and System Aspects; Procedures for the 5G System; Stage 2 (Release 15)," 3GPP TS 23.502 V15.0.0, pp. 1-258, 3rd Generation Partnership Project, Valbonne, France (Dec. 2017).
(Continued)

*Primary Examiner* — Hirdepal Singh
(74) *Attorney, Agent, or Firm* — Leydig, Voit & Mayer, Ltd.

(57) ABSTRACT

Embodiments of this application disclose a network access method, used to restrict a network access range of a terminal device, to meet a requirement for restricting the terminal device within a specified range. The method in the embodiments of this application includes: receiving, by an access management network element, information about an area accessed by a terminal device; obtaining, by the access management network element, information about an area allowed to be accessed by the terminal device; and determining, by the access management network element based on the information about the area accessed by the terminal device and the information about the area allowed to be accessed by the terminal device, whether to allow access of the terminal device.

20 Claims, 11 Drawing Sheets

(58) Field of Classification Search
USPC ................................................. 455/435.1
See application file for complete search history.

(56) References Cited

U.S. PATENT DOCUMENTS

| | | | |
|---|---|---|---|
| 2001/0005676 | A1 | 6/2001 | Masuda et al. |
| 2013/0150039 | A1 | 6/2013 | Ramle et al. |
| 2020/0077356 | A1* | 3/2020 | Youn ............... H04W 8/065 |
| 2020/0092706 | A1* | 3/2020 | Kawasaki ........... H04W 60/00 |
| 2020/0336935 | A1* | 10/2020 | Takakura ......... H04W 28/0289 |
| 2020/0382941 | A1* | 12/2020 | Lee .................. H04W 76/27 |
| 2020/0389864 | A1* | 12/2020 | Ramle ................ H04W 8/08 |
| 2021/0176796 | A1* | 6/2021 | Liu .................. H04W 76/27 |

FOREIGN PATENT DOCUMENTS

| | | |
|---|---|---|
| CN | 102271382 A | 12/2011 |
| CN | 102448038 A | 5/2012 |
| CN | 103096397 A | 5/2013 |
| CN | 104205649 A | 12/2014 |
| CN | 105992302 A | 10/2016 |
| WO | 9907167 A1 | 2/1999 |
| WO | 9921377 A1 | 4/1999 |
| WO | 2016202174 A1 | 12/2016 |

OTHER PUBLICATIONS

"3rd Generation Partnership Project; Technical Specification Group Services and System Aspects; System Architecture for the 5G System; Stage 2 (Release 15)," 3GPP TS 23.501 V15.0.0, pp. 1-181, 3rd Generation Partnership Project, Valbonne, France (Dec. 2017).

"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413 V15.0.0, pp. 1-367, 3rd Generation Partnership Project, Valbonne, France (Dec. 2017).

* cited by examiner

NETWORK ACCESS METHOD AND RELATED APPARATUS

CROSS-REFERENCE TO RELATED APPLICATIONS

This application is a continuation of International Application No. PCT/CN2019/073366, filed on Jan. 28, 2019, which claims priority to Chinese Patent Application No. 201810153155.7, filed on Feb. 14, 2018. The disclosure of the aforementioned applications are hereby incorporated by reference in their entireties.

TECHNICAL FIELD

This application relates to the field of network communications technologies, and in particular, to a network access method and a related apparatus.

BACKGROUND

With development of network technologies, networks have become a part of peoples' lives, and bring great convenience to peoples' lives. To meet peoples' requirements for using a network, a wireless network (such as Wi-Fi) access point is provided in many places, so that a user can conveniently access a Wi-Fi access point and then access the Internet.

While the network brings convenience, there is also a new requirement for network access. For example, to meet a service requirement, network access of a terminal device within a specified range is restricted, so that the terminal device can access a network only in the specified range by using an access network device, and further performs a related service. For example, a terminal device having a specific service function can access a network to perform a particular service only within a specified range such as at home or in an office building. Therefore, based on the foregoing service requirement, this application proposes a new method for restricting an access range of a terminal device, to meet a requirement that a terminal device can access a network only within a specified range.

SUMMARY

This application provides a network access method, used to restrict a network access range of a terminal device, to meet a requirement for restricting the terminal device within a specified range.

In view of this, according to a first aspect, this application provides a network access method. The method includes: receiving, by an access management network element, information about an area accessed by a terminal device; obtaining, by the access management network element, information about an area allowed to be accessed by the terminal device; and determining, by the access management network element based on the information about the area accessed by the terminal device and the information about the area allowed to be accessed by the terminal device, whether to allow access of the terminal device.

It can be learned from the foregoing technical solutions that this application has the following advantages:

The access management network element determines, based on the information about the area accessed by the terminal device and the information about the area allowed to be accessed by the terminal device, whether the terminal device can access. Therefore, the access management network element may restrict the area accessed by the terminal device to a range of the area allowed to be accessed, so that the terminal device cannot access a network within the range of the area allowed to be accessed by the terminal device. It may be understood that the range of the area allowed to be accessed is controllable in an access management network. The access management network element may control the area allowed to be accessed within a preset range based on a requirement of a related service, to meet a requirement that the terminal device can access the network only within a specified range and further perform the related service.

In a possible implementation of the first aspect of this application, the receiving, by an access management network element, information about an area accessed by a terminal device includes: receiving, by the access management network element, the information that is about the area accessed by the terminal device and that is sent by an access network element, where the information about the area accessed by the terminal device includes: at least one of information about an area currently accessed by the terminal device and information about a neighboring area of the area currently accessed by the terminal device; or receiving, by the access management network element, information that is about an area currently accessed by the terminal device and that is sent by an access network element; and receiving, by the access management network element, information that is about a neighboring area of the area currently accessed by the terminal device and that is sent by a topology management network element.

In a possible implementation of the first aspect of this application, the obtaining, by the access management network element, information about an area allowed to be accessed by the terminal device includes: sending, by the access management network element, a request message to an information providing network element, to obtain the information about the area allowed to be accessed by the terminal device, where the information providing network element includes: a unified device management network element, a policy control network element, or an authentication service network element.

In a possible implementation of the first aspect of this application, the determining, by the access management network element based on the information about the area accessed by the terminal device and the information about the area allowed to be accessed by the terminal device, whether to allow the access of the terminal device includes: determining, by the access management network element based on whether the information about the area allowed to be accessed by the terminal device includes all or a part of the information about the area accessed by the terminal device, whether to allow the access of the terminal device; and if yes, allowing, by the access management network element, the access of the terminal device; or if no, rejecting, by the access management network element, the access of the terminal device.

In a possible implementation of the first aspect of this application, the determining, by the access management network element based on the information about the area accessed by the terminal device and the information about the area allowed to be accessed by the terminal device, whether to allow access of the terminal device includes: identifying, by the access management network element, whether verification information of the area accessed by the terminal device matches verification information of the area allowed to be accessed by the terminal device; and if yes, allowing, by the access management network element, the access of the terminal device; or if no, rejecting, by the access management network element, the access of the terminal device.

In a possible implementation of the first aspect of this application, the method further includes: if the access management network element identifies, in a registration process, that the information about the area accessed by the terminal device includes all or a part of the information about the area allowed to be accessed by the terminal device, allowing, by the access management network element, registration of the terminal device; otherwise rejecting, by the access management network element, registration of the terminal device or rejecting establishment of a session connection by the terminal device.

In a possible implementation of the first aspect of this application, the method further includes: if the access management network element identifies, in a handover process, that the information about the area accessed by the terminal device includes all or a part of the information about the area allowed to be accessed by the terminal device, allowing, by the access management network element, the terminal device to perform handover; otherwise rejecting, by the access management network element, the terminal device to perform handover, or initiating a deregistration procedure to the terminal device, or initiating a session deletion procedure to the terminal device.

In a possible implementation of the first aspect of this application, the method further includes: if the access management network element identifies, in a session establishment process, that the information about the area accessed by the terminal device includes all or a part of the information about the area allowed to be accessed by the terminal device, allowing, by the access management network element, the terminal device to establish a session connection; otherwise rejecting, by the access management network element, the terminal device to establish the session connection, or initiating a deregistration procedure to the terminal device, or initiating a session deletion procedure to the terminal device.

According to a second aspect, this application provides a network access method. The method includes:

learning, by an access network element, that a terminal device can access only an area allowed to be accessed; and sending, by the access network element, information about an area accessed by the terminal device to an access management network element.

It can be learned from the foregoing technical solutions that this application has the following advantages:

After learning that the terminal device can access only the area allowed to be accessed, the access network element sends information about an area allowed to be accessed by the terminal device to the access management network element, so that after learning that the terminal device is allowed to access the area, the access management network element restricts the terminal device to access the area allowed to be accessed by the terminal device, to restrict the area accessed by the terminal device.

With reference to the second aspect of this application, in a first possible implementation of the second aspect of this application, the learning, by an access network element, that a terminal device can access only an area allowed to be accessed includes: learning, by the access network element by receiving an access restriction identifier sent by the terminal device, that the terminal device can access only the area allowed to be accessed; or learning, by the access network element by receiving an indication message sent by the access management network element, that the terminal device can access only the area allowed to be accessed, where the indication message is used to indicate that the access network element sends the information about the area accessed by the terminal device to the access management network element.

With reference to the second aspect of this application or the first possible implementation of the second aspect, in a second possible implementation of the second aspect of this application, the sending, by the access network element, information about an area accessed by the terminal device to an access management network element includes: sending, by the access network element, the information about the area accessed by the terminal device to the access management network element, where the information about the area accessed by the terminal device includes: information about an area currently accessed by the terminal device and information about a neighboring area of the area currently accessed by the terminal device; or sending, by the access network element, only information about an area currently accessed by the terminal device to the access management network element.

According to a third aspect, this application provides a network access method. The method includes:

determining, by a terminal device, that the terminal device can access only an area allowed to be accessed; and sending, by the terminal device, indication information to an access network element, where the indication information is used to indicate that the access network element sends information about an area accessed by the terminal device to an access management network element.

It can be learned from the foregoing technical solutions that this application has the following advantages:

After the terminal device determines that the terminal device can access a network only in area allowed to be accessed, the terminal device sends the indication information to the access network element, to trigger the access network element to send the information about the area accessed by the terminal device to the access management network element, so that the access management network element learns of the area accessed by the terminal device, and determines the area accessed by the terminal device to determine whether the terminal device is in the area allowed to be accessed. Therefore, the access management network element restricts the terminal device to access the area allowed to be accessed by the terminal device, to restrict the area accessed by the terminal device.

With reference to the third aspect of this application, in a first possible implementation of the third aspect of this application, the determining, by a terminal device, that the terminal device can access only an area allowed to be accessed includes: determining, by the terminal device based on a device type of the terminal device, that the terminal device can access only the area allowed to be accessed; or determining, by the terminal device based on subscription information of the terminal device, that the terminal device can access only the area allowed to be accessed.

According to a fourth aspect, this application provides a network access method. The method includes:

obtaining, by an information providing network element, information about an area allowed to be accessed by a terminal device; and sending, by the information providing network element, the information about the area allowed to be accessed by the terminal device to an access management network element.

It can be learned from the foregoing technical solutions that this application has the following advantages:

After learning that the terminal device can access only the area allowed to be accessed, the information providing network element sends the information about the area allowed to be accessed by the terminal device to the access management network element, so that after learning that the terminal device is allowed to access the area, the access management network element restricts the terminal device to access the area allowed to be accessed by the terminal device, to restrict the area accessed by the terminal device.

With reference to the fourth aspect of this application, in a first possible implementation of the fourth aspect of this application, the obtaining, by an information providing network element, information about an area allowed to be accessed by a terminal device includes: determining, by the information providing network element based on subscription information of the terminal device, the information about the area allowed to be accessed by the terminal device.

With reference to the fourth aspect of this application or the first possible implementation of the fourth aspect, in a second possible implementation of the fourth aspect of this application, the sending, by the information providing network element, the information about the area allowed to be accessed by the terminal device to an access management network element includes: after the information providing network element receives a request message sent by the access management network element, sending, by the information providing network element, the information about the area allowed to be accessed by the terminal device to the access management network element.

The information about the area allowed to be accessed by the terminal device according to any one of the first aspect to the fourth aspect includes: at least one of an identifier of the area accessed by the terminal device, an identifier of a neighboring area of the area accessed by the terminal device, and verification information of the area accessed by the terminal device. The information about the area allowed to be accessed by the terminal device includes: at least one of an identifier of the area allowed to be accessed by the terminal device and verification information of the area allowed to be accessed by the terminal device. The identifier of the area accessed by the terminal device includes: any one of an identifier of an access cell, an identifier of an access network device, an interface line identifier, a virtual local area network identifier, and a port identifier; and the identifier of the neighboring area of the area accessed by the terminal device includes: an identifier of a neighboring cell of the access cell or an identifier of a neighboring access network device of the access network device.

Therefore, according to the implementation methods of this application, the area allowed to be accessed by the terminal device may be one or more access cells. Therefore, according to the network access method, a range allowed to be accessed by the terminal device may be restricted to a range of one or more cells, so that the access management network element restricts the area allowed to be accessed by the terminal device to a cell granularity range.

According to a fifth aspect, an embodiment of this application provides an access management network element. The access management network element has a function for implementing the access management network element according to the foregoing method embodiments. The function may be implemented by hardware, or may be implemented by hardware executing corresponding software. The hardware or the software includes one or more modules corresponding to the foregoing functions.

According to a sixth aspect, an embodiment of this application provides an access network element. The access network element has a function for implementing the access network element according to the foregoing method embodiments. The function may be implemented by hardware, or may be implemented by hardware executing corresponding software. The hardware or the software includes one or more modules corresponding to the foregoing functions.

According to a seventh aspect, an embodiment of this application provides an information providing network element. The information providing network element has a function for implementing the information providing network element according to the foregoing method embodiments. The function may be implemented by hardware, or may be implemented by hardware executing corresponding software. The hardware or the software includes one or more modules corresponding to the foregoing functions.

According to an eighth aspect, an embodiment of this application provides a terminal device. The terminal device has a function for implementing the terminal device according to the foregoing method embodiments. The function may be implemented by hardware, or may be implemented by hardware executing corresponding software. The hardware or the software includes one or more modules corresponding to the foregoing functions.

According to a ninth aspect, an embodiment of this application provides a communications apparatus. The communications apparatus includes a storage element and a processing element. The storage element stores a computer operation instruction, and the processing element is configured to perform, by invoking the computer operation instruction, the network access method corresponding to any one of the access management network element according to the first aspect, the access network element according to the second aspect, the terminal device according to the third aspect, and the information providing network element according to the fourth aspect.

Optionally, the foregoing storage element includes a memory or a chip having a storage function. Similarly, the processing element includes a processor or a chip having a processing capability.

The foregoing memory may be a read-only memory (ROM) or another type of static storage device that can store static information and an instruction, a random access memory (RAM) or another type of dynamic storage device that can store information and an instruction, or may be an electrically erasable programmable read-only memory (EE-PROM), a compact disc read-only memory (CD-ROM) or another compact disc storage, an optical disc storage (including a compact disc, a laser disc, an optical disc, a digital versatile disc, and a Blu-ray disc, or the like), a magnetic disk storage medium or another magnetic storage device, or any other medium that can be used to carry or store expected program code in a form of an instruction or a data structure and that can be accessed by a computer. However, the memory is not limited thereto. The memory may exist independently, and is connected to the processor by using the bus. The memory may alternatively be integrated with the processor.

The foregoing processor may be a general-purpose central processing unit (CPU), a microprocessor, an application-specific integrated circuit (ASIC)), or one or more integrated circuits configured to control program execution in the solutions of this application.

According to a tenth aspect, an embodiment of this application provides a computer storage medium, configured to store a computer software instruction used by a device in the access management network element according to the first aspect, the access network element according to the second aspect, the terminal device according to the third aspect, and the information providing network element according to the fourth aspect. When the computer software instruction is run on a computer, the computer is enabled to perform the network access methods according to any one of the first aspect to the fourth aspect.

According to an eleventh aspect, an embodiment of this application provides a computer program product including an instruction. When the instruction is run on a computer, the computer is enabled to perform the network access methods according to any one of the first aspect to the fourth aspect.

DESCRIPTION OF EMBODIMENTS

Figure 1:
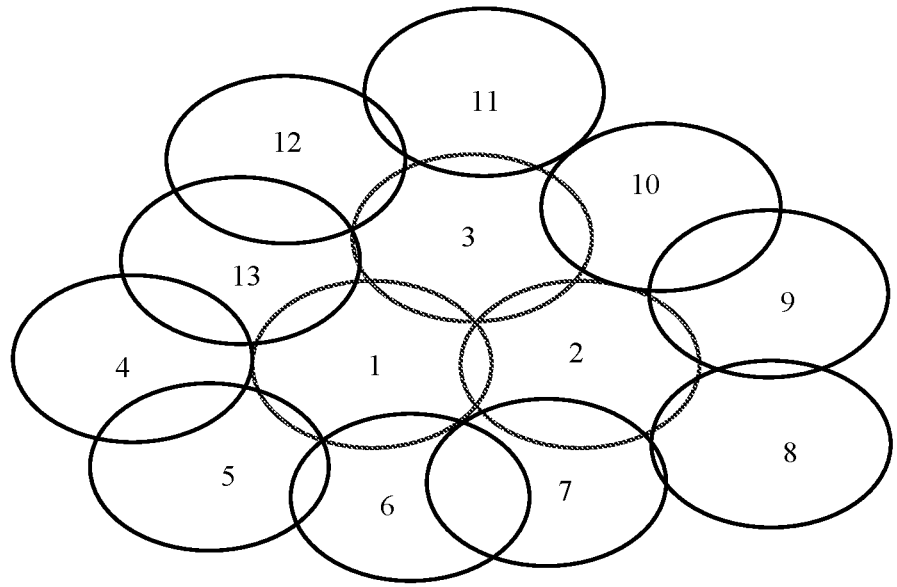
FIG. 1 is a schematic diagram of a network access method according to an embodiment of this application.

The following clearly and describes the technical solutions in this application with reference to the accompanying drawings in the embodiments of this application. Clearly, the described embodiments are merely some but not all of the embodiments of this application.

In the specification, claims, and accompanying drawings of this application, the terms "first", "second", "third", "fourth", and the like (if existent) are intended to distinguish between similar objects but do not necessarily indicate a particular order or sequence. It should be understood that the data used in such a way are interchangeable so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

A network access method in the embodiments of this application may be applicable to the following communications networks: a global system for mobile communications (GSM), a code division multiple access (CDMA) system, a wideband code division multiple access (WCDMA) system, a general packet radio service (GPRS) system, a universal mobile telecommunications system (UMTS), an LTE system and an evolved system thereof, a new radio (NR) communications system, a MulteFire network, or a home eNodeB network, a mobile network accessed by using a non-3rd Generation Partnership Project (N3GPP) (such as Wi-Fi), a fixed wireless access (FWA) network, a fixed access network, a subsequently evolved access network, and the like.

Before specific embodiments are described, concepts such as a base station, a cell, and a terminal device in this application are first briefly described.

A network device in the embodiments of this application may be a long term evolution (LTE) system or an evolved NodeB (eNB or e-NodeB) in a licensed-assisted access using long term evolution (LAA-LTE) system, a macro base station, a micro base station (also referred to as a "small cell"), a picocell base station, an access point (AP), a transmission point (transmission point, TP), a new generation NodeB (gNodeB), a fixed network access network (Wireline Access Network), or the like.

A cell mentioned in the embodiments of this application may be a cell corresponding to a base station. The cell may belong to a macro base station, or may belong to a base station corresponding to a small cell. The small cell herein may include: a metro cell, a micro cell, a pico cell, a femto cell, and the like. These small cells have characteristics of small coverage and low transmit power, and are applicable to providing a high-speed data transmission service.

A terminal device in the embodiments of this application may be referred to as user equipment (UE), a mobile station (MS), a mobile terminal, a smart terminal, or the like. The terminal device may communicate with one or more core networks by using a radio access network (RAN). For example, the terminal device may be a mobile phone (or referred to as a "cellular" phone), a computer, a home gateway, a fixed network terminal, or the like. Alternatively, the terminal device may be a portable, pocket-sized, handheld, computer built-in, or vehicle-mounted mobile apparatus, or a terminal device in a 5G network.

An access management device in the embodiments of this application may be used for access management or session management of a terminal, and may be specifically an access management and mobility management function (AMF) network element or a session management function (SMF) network element in a mobile network.

FIG. 1 is a schematic diagram of a network access method according to an embodiment of this application. FIG. 1 shows 13 access areas in total, which are numbered 1 to 13 in sequence. Areas numbered 1 to 3 are three subscription areas to which a terminal device subscribes, that is, areas allowed to be accessed by the terminal device; and areas numbered 4 to 13 are neighboring areas of the foregoing areas numbered 1 to 3. When an access area reported by the terminal device is in the three subscription areas numbered 1 to 3, the terminal device is allowed to access a network. Otherwise, the terminal device is rejected to access the network. Because a signal status of the terminal device changes, the terminal device may be handed over to a neighboring area (in the areas numbered 4 to 13), but an actual location of the terminal device does not change. Therefore, in this case, the terminal device should be allowed to continue to access the network, that is, the area allowed to be accessed by the terminal device may include the neighboring areas of the subscription areas.

Figure 2:
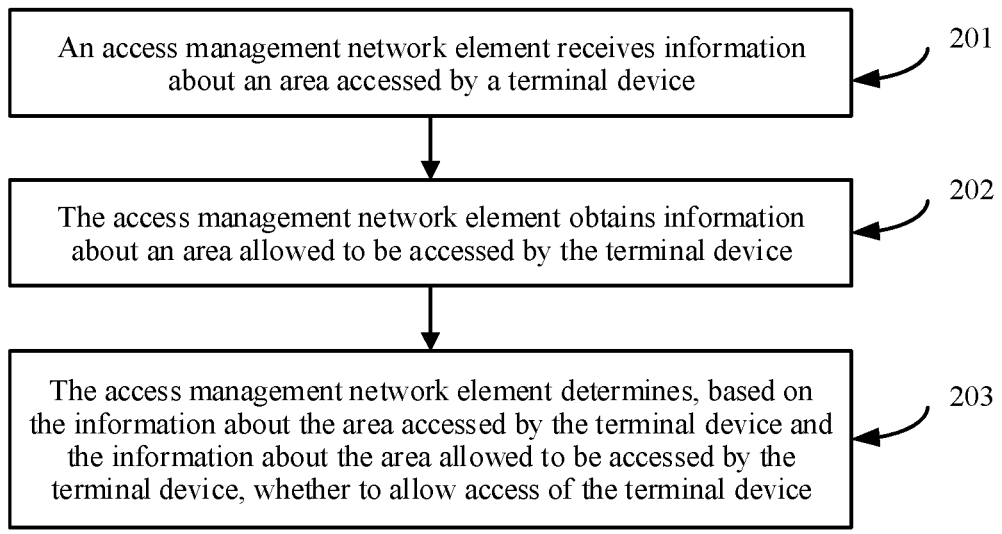
FIG. 2 is a schematic diagram of an embodiment of a network access method according to an embodiment of this application.

To facilitate understanding of the network access method in the embodiments of this application, the following describes the network access method in this application in detail with reference to specific embodiments. Details are as follows:

As shown in FIG. 2, an embodiment of a network access method according to an embodiment of this application includes the following steps.

201. An access management network element receives information about an area accessed by a terminal device.

The information about the area accessed by the terminal device includes: at least one of an identifier of the area accessed by the terminal device, an identifier of a neighboring area of the area accessed by the terminal device, and a verification message of the area accessed by the terminal device. Further, the identifier of the area accessed by the terminal device may be any one of an identifier of an access cell, an interface line identifier, a virtual local area network identifier, a port identifier, and an identifier of an access network device. In this case, the corresponding identifier of the neighboring area of the area accessed by the terminal device may be an identifier of a neighboring cell of the access cell or an identifier of a neighboring access network device of the access network device.

It should be noted that the access network device may be specifically an access network element of a mobile network or an access network element of a fixed network. The verification message of the area accessed by the terminal device may be specifically an account password, or may be a verification message in another form, for example, an SMS verification password or an image verification password. This is not limited in this application.

When an access network element is the access network element of the mobile network, the identifier of the area accessed by the terminal device may be a cell identifier of a current access cell or an identifier of the access network element of the mobile network. When the access network element is the access network element of the fixed network, the identifier of the area accessed by the terminal device may be any one of a current interface line identifier, a current virtual local area network identifier, a current port identifier, and a current identifier of the access network element of the fixed network.

The access management network may obtain the information about the area accessed by the terminal device from the access network element, or obtain the information from another network element that stores the information about the area accessed by the terminal device.

202. The access management network element obtains information about an area allowed to be accessed by the terminal device.

The information about the area allowed to be accessed by the terminal device is information about an access area that the access management network element allows the terminal device to access, for example, may be information (such as an identifier) about the access areas numbered 1 to 3 shown in FIG. 1. Related descriptions of the information about the area allowed to be accessed by the terminal device are similar to descriptions of the information about the area accessed by the terminal device in step 201, and details are not described herein again.

The access management network element may obtain the information about the area allowed to be accessed by the terminal device from an information providing network element. The information providing network element may be one of a unified data management (UDM) network element, a policy control function (PCF) network element, or an authentication service function (AUSF) network element, and the authentication service network element may also be referred to as an authentication network element.

203. The access management network element determines, based on the information about the area accessed by the terminal device and the information about the area allowed to be accessed by the terminal device, whether to allow access of the terminal device.

If yes, the access management network element allows the access of the terminal device. In this case, specifically, if the network access method is used in a registration process of the terminal device, the access management network element allows the terminal device to perform registration. If the network access method is used in a handover process of the area accessed by the terminal device, the access management network element allows of the terminal device to perform handover. If the network access method is used in a handover process of the area accessed by the terminal device, the access management network element allows the terminal device to perform session establishment.

If no, the access management network element rejects the access of the terminal device. In this case, specifically, if the network access method is used in a registration process of the terminal device, the access management network element rejects the terminal device to perform registration or rejects the terminal device to establish a session connection. If the network access method is used in a handover process of the area accessed by the terminal device, the access management network element rejects the terminal device to perform handover, or initiates a deregistration procedure to the terminal device, or initiates a session deletion procedure to the terminal device. If the network access method is used in a handover process of the area accessed by the terminal device, the access management network element rejects the terminal device to establish a session connection, or initiates a deregistration procedure to the terminal device, or initiates a session deletion procedure to the terminal device. In addition, the access management network element may further determine whether the verification message of the area accessed by the terminal device matches a verification message of the area allowed to be accessed by the terminal device.

When the network access method is used in a registration process, the access management network element determines whether the verification message of the area accessed by the terminal device matches a verification message of the area allowed to be accessed by the terminal device. If yes, the access management network element allows the terminal device to perform registration. If no, the access management network element rejects the terminal device to perform registration or rejects the terminal device to establish a session connection.

When the network access method is used in a handover process of an access area, the access management network element determines whether the verification message of the area accessed by the terminal device matches a verification message of the area allowed to be accessed by the terminal device. If yes, the access management network element allows the terminal device to perform handover. If no, the access management network element rejects the terminal device to perform handover, or initiates a deregistration procedure to the terminal device, or initiates a session deletion procedure to the terminal device.

When the network access method is used in a session connection process, the access management network element determines whether the verification message of the area accessed by the terminal device matches a verification message of the area allowed to be accessed by the terminal device. If yes, the access management network element allows the terminal device to establish a session connection. If no, the access management network element rejects the terminal device to establish the session connection, or initiates a deregistration procedure to the terminal device, or initiates a session deletion procedure to the terminal device. It should be noted that the session establishment process may be a packet data unit (PDU) session establishment process or a service request process.

The foregoing matching may be understood as that the verification message of the area accessed by the terminal device is the same as the verification message of the area allowed to be accessed by the terminal device, or may be understood as that the verification message of the area accessed by the terminal device and the verification message of the area allowed to be accessed by the terminal device meet a preset correspondence.

In this embodiment of this application, an identifier of the area allowed to be accessed by the terminal device may be any one of an identifier of an access cell, an identifier of an access network device, an interface line identifier, a virtual local area network identifier, and a port identifier. It can be learned that an area in which access of the terminal device is restricted is within a range of one or more cells, and the cell range is a small range. For example, a signal of a cell covers an office building or a room. Therefore, the network access method in this embodiment of this application can narrow down an area range restricted by the terminal device, to meet a requirement that the terminal device can access a network only within a relatively small range.

It should be noted that the cell in this application described above may be a small cell, for example, a metro cell, a micro cell, a pico cell, a femto cell, and the like. In addition, these small cells have characteristics of small coverage and low transmit power, and are applicable to providing a high-speed data transmission service. Therefore, the network access method in this embodiment of this application can better implement the foregoing function of restricting the terminal device to perform a particular service in a small range.

Figure 3:
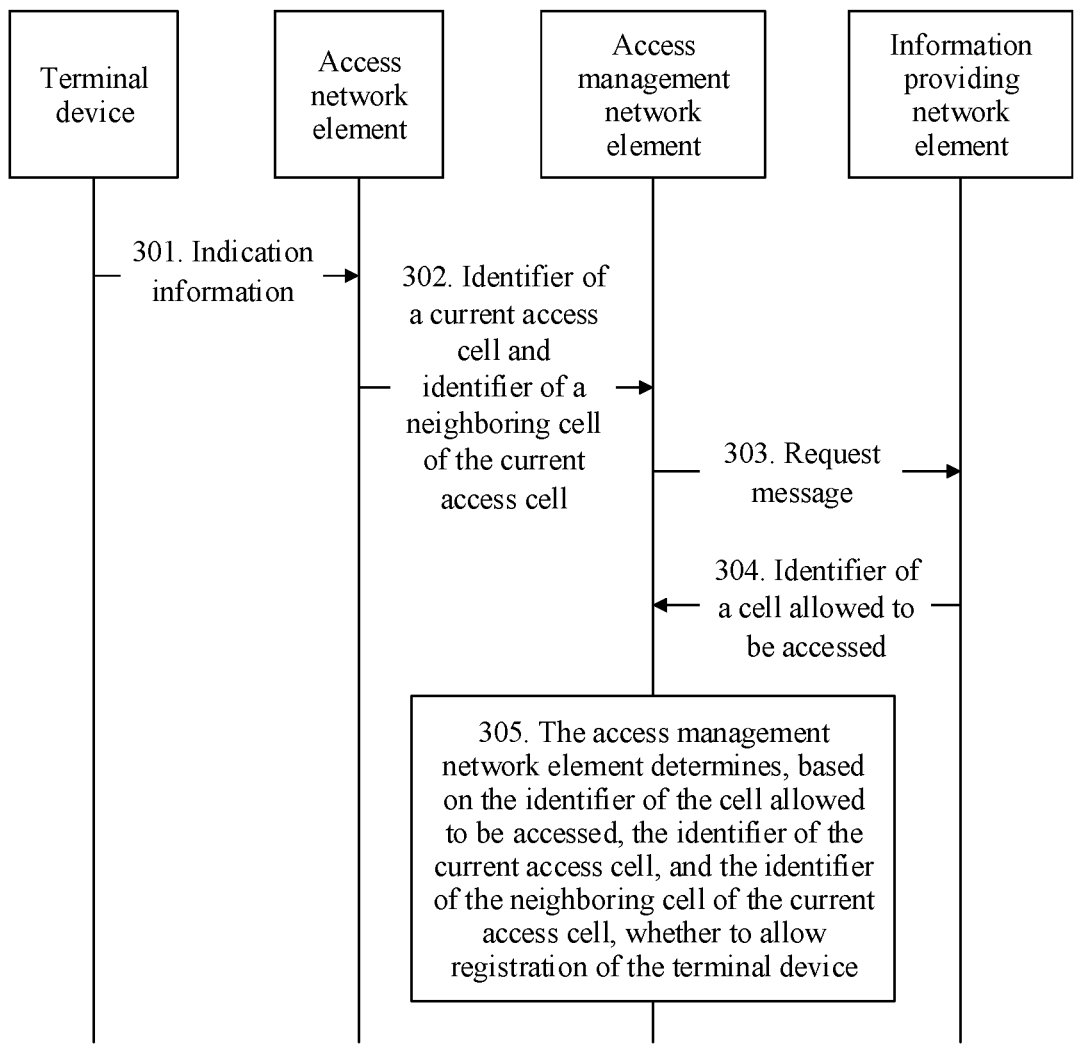
FIG. 3 is a schematic diagram of another embodiment of a network access method according to an embodiment of this application.

As described above, the area accessed by the terminal device may be coverage of one or more cells (or small cells). It may be understood that a cell identifier or a small cell identifier is a currently commonly-used identifier for identifying and distinguishing different cells or small cells. In this case, the access management network element may determine, based on the cell identifier, access of the terminal device to the network. The following describes in detail the network access method in this embodiment of this application by using a cell identifier as a determining basis. Details are as follows. As shown in FIG. 3, an embodiment of a network access method according to an embodiment of this application includes the following steps.

301. A terminal device sends indication information to an access network element.

In a registration process of the terminal device, the terminal device sends registration information to an access network, where the registration information is used to request to perform a registration procedure of the terminal device, so that the terminal device can access a network. The registration information carries the foregoing indication information, and the instruction information is used to indicate that the terminal device is a terminal whose access range is restricted, and the terminal device can access only a cell corresponding to the information about an area allowed to be accessed.

The cell corresponding to the information about the area allowed to be accessed includes a cell allowed to be accessed, and the cell allowed to be accessed is a cell that is allowed to be accessed by the terminal device and that is agreed by the terminal device and an information providing network element, to meet a requirement that the terminal device can perform a related service only in a small range. When the terminal device is not in signal coverage of the cell allowed to be accessed, the terminal device cannot access the network. In other words, a network access range of the terminal device is restricted by the cell allowed to be accessed. In addition, correspondingly, as described in FIG. 1, because signal strength of the terminal decreases, the terminal device may be handed over to a neighboring cell of a cell allowed to be accessed. However, an actual location of the terminal device does not change. Therefore, in this case, the terminal device is also allowed to continue to access the network, and the cell allowed to be accessed by the terminal device may include the foregoing neighboring cell of the cell allowed to be accessed.

The foregoing indication information may be an access restriction indication, for example, device type information, or may be other information having a similar function. This is not limited in this application. It may be understood that, if the device type indication information is not sent, it may be considered by default that the terminal device is not a terminal restricted to access a cell. Once the device type information is sent, it indicates that the device is a terminal restricted to access the cell. In addition, the device type information may further include device type information of an access-restricted cell and device type information of an access-restricted cell.

In a registration process of the terminal device, the foregoing indication information may not be carried in the registration information for sending, but is separately sent or carried in other interaction information in the registration process for sending. This is not limited in this embodiment of this application.

It should be noted that an information providing network element in this embodiment and another embodiment of this application may be a unified data management network element, a policy control network element, or an authentication network element, or may be another network element having a similar function. This is not limited in this application.

302. The access network element sends an identifier of a current access cell and an identifier of a neighboring cell of the current access cell to an access management network element.

After the access management network element receives the indication information (for example, the access restriction indication) of the terminal device, the access network element sends the identifier of the current access cell and the identifier of the neighboring cell of the current access cell to the access management network element. The current access cell is determined based on current location information of the terminal device. When the terminal device moves, the current access cell of the terminal device also changes accordingly.

The neighboring cell of the current access cell may be a cell that is adjacent to the current access cell in location, or may be a cell in a neighboring cell relationship table of the current access cell, where the neighboring cell relationship table is used to indicate a neighboring relationship between cells. If a cell A is located in a neighboring cell relationship table of a cell B, in this case, the cell A is a neighboring cell of the cell B. At the same time, if the cell B is in a neighboring cell relationship table of the cell A, the cell A and the cell B are neighboring cells of each other.

It is easy to understand that the access network element is a network device responsible for access of the terminal device, and the access network element itself has a capability of learning of the current access cell and the neighboring cell of the terminal device. For specific learning details, refer to descriptions in related documents, and details are not described in this application.

303. The access management network element sends a request message to the information providing network element.

After the access management network element receives the identifier that is of the current access cell and that is sent by the access network element, the access management network element learns, based on an access restriction identifier of the terminal device, that the terminal device is a terminal whose access range is restricted, so that the access management network element sends the request message to the information providing network element, to obtain cell information corresponding to the information about the area allowed to be accessed by the terminal device. Optionally, the information providing network element may provide geographic location information or administrative location information for the access management network element. Then, the geographic location information or the administrative location information is mapped as the corresponding cell information by the access management network element maps.

The information that is about the area allowed to be accessed by and that is recorded by the information providing network element is from a subscription process between the terminal device and the information providing network element. For a specific subscription process, refer to descriptions in subsequent FIG. 8 to FIG. 11, and details are not described herein.

304. The information providing network element returns the identifier of the cell allowed to be accessed to the access management network element.

After the information providing network element receives the request message sent by the access management network element, the information providing network element returns the identifier of the cell allowed to be accessed by the terminal device to the access management network element, so that the access management network element learns of the cell range in which the terminal device is restricted to access.

305. The access management network element determines, based on the identifier of the cell allowed to be accessed, the identifier of the current access cell, and the identifier of the neighboring cell of the current access cell, whether to allow registration of the terminal device.

The access management network element determines whether one or more identifiers in the identifier of the current access cell and the identifier of the neighboring cell of the current access cell are the same as the identifier of the cell allowed to be accessed. If the one or more identifiers are the same as the identifier of the cell allowed to be accessed, the access management network element allows the terminal device to perform registration.

If none of the identifier of the current access cell and the identifier of the neighboring cell of the current access cell is the same as the identifier of the cell allowed to be accessed, the access management network element initiates a deregistration procedure of the terminal device, so that the terminal device cannot access the network by using the current access cell or the neighboring cell of the current access cell.

It should be noted that the foregoing step 301 to step 305 describe a process in which the terminal device accesses a mobile network, for example, a 5G mobile network. When the terminal device accesses a fixed network (a MulteFire network, a home eNodeB network, or a fixed access network), the foregoing cell identifier for identifying the restricted access range may be replaced with any one of an interface line identifier, a virtual local area network identifier, or a port identifier that correspond to the location of the terminal device. This is not described in detail herein by using an example. For details, refer to related descriptions in FIG. 3.

In this embodiment, the area accessed by the terminal device is restricted within one or more ranges of cells allowed to be accessed, so that a restricted area range of the terminal device can be effectively narrowed down, and a requirement that the terminal device can access the network only in a specified small range to perform a related service can be met.

Figure 4:
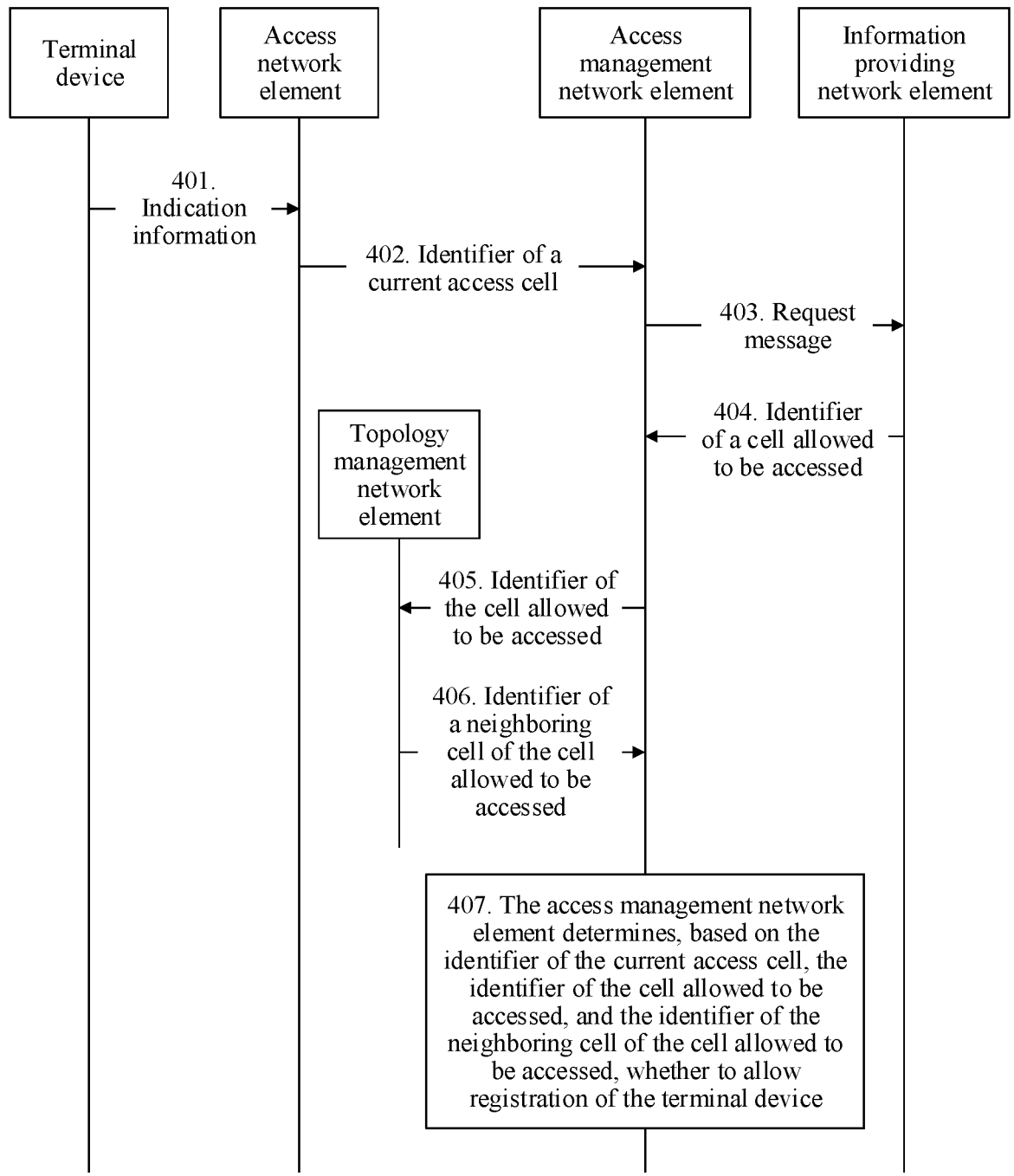
FIG. 4 is a schematic diagram of still another embodiment of a network access method according to an embodiment of this application.

As shown in FIG. 4, another embodiment of a network access method according to an embodiment of this application includes the following steps.

401. A terminal device sends indication information to an access network element.

This step is similar to step 301. For detailed descriptions, refer to related descriptions in step 301, and details are not described herein again.

402. The access network element sends an identifier of a current access cell to an access management network element.

A difference between this step and step 302 lies in that the access network element sends only the identifier of the current access cell to the terminal device, but does not send an identifier of a neighboring cell of the current access cell. Other related descriptions are similar to the related descriptions in step 302. For details, refer to the related descriptions in step 302, and details are not described herein again.

403. The access management network element sends a request message to the information providing network element.

This step is similar to step 303. For detailed descriptions, refer to related descriptions in step 303, and details are not described herein again.

404. The information providing network element returns the identifier of the cell allowed to be accessed to the access management network element.

This step is similar to step 304. For detailed descriptions, refer to related descriptions in step 304, and details are not described herein again.

405. The access management network element sends an identifier of a cell allowed to be accessed to a topology management network element.

After the access management network element receives the identifier that is of the cell allowed to be accessed and that is sent by an information providing network element, the access management network element sends the identifier of the cell allowed to be accessed to the topology management network element, to obtain the identifier of the neighboring cell of the cell allowed to be accessed.

It may be understood that, in this case, the information providing network element does not know the identifier of the neighboring cell of the cell allowed to be accessed. Therefore, the access management network element needs to obtain the identifier of the neighboring cell of the cell allowed to be accessed from the topology management network element.

406. The topology management network element sends the identifier of the neighboring cell of the cell allowed to be accessed to the access management network element.

After the topology management network element receives the identifier of the cell allowed to be accessed that is sent by the access management network element, the topology management network element returns the identifier of the neighboring cell of the cell allowed to be accessed to the access management network element.

Similar to the foregoing current access cell, the neighboring cell of the cell allowed to be accessed may be a cell adjacent to the cell allowed to be accessed in location, or may be a cell in a neighboring relationship table of the cell allowed to be accessed. This is not limited in this application.

The topology management network element is a network element configured to convert location information into network topology location information (for example, cell information). The topology management network element may be specifically a network exposure function (NEF) network element or a service capability exposure function (SCEF) network element. Alternatively, the topology management network element may be another network element that has a function similar to the foregoing conversion function. This is not limited in this application.

407. The access management network element determines, based on the identifier of the current access cell, the identifier of the cell allowed to be accessed, and the identifier of the neighboring cell of the cell allowed to be accessed, whether to allow registration of the terminal device.

The access management network element determines whether one or more identifiers in the identifier of the cell allowed to be accessed and the identifier of the neighboring cell of the cell allowed to be accessed are the same as the identifier of the current access cell. If the one or more identifiers are the same as the identifier of the current access cell, the access management network element allows the terminal device to perform registration.

If none of the identifier of the cell allowed to be accessed and the identifier of the neighboring cell of the cell allowed to be accessed is the same as the identifier of the current access cell, the access management network element initiates a deregistration procedure of the terminal device, so that the terminal device cannot access the network by using the current access cell.

Beneficial effects of this embodiment are similar to beneficial effects of the embodiment in FIG. 3, and details are not described herein again.

Figure 5:
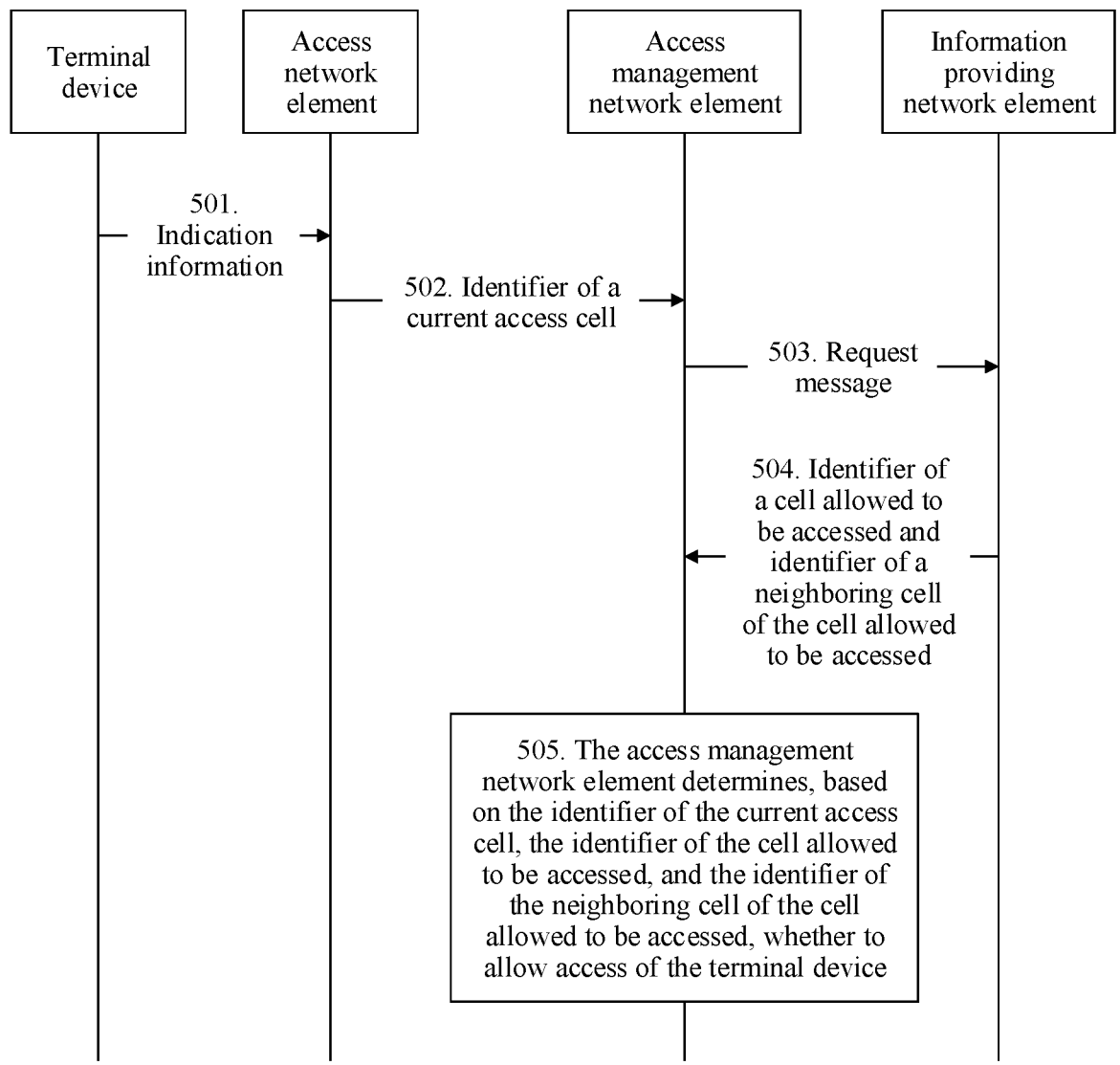
FIG. 5 is a schematic diagram of still another embodiment of a network access method according to an embodiment of this application.

As shown in FIG. 5, another embodiment of a network access method according to an embodiment of this application includes the following steps.

501. A terminal device sends indication information to an access network element.

This step is similar to step 301. For detailed descriptions, refer to related descriptions in step 301, and details are not described herein again.

502. The access network element sends an identifier of a current access cell to an access management network element.

A difference between this step and step 302 lies in that the access network element sends only the identifier of the current access cell to the terminal device, but does not send an identifier of a neighboring cell of the current access cell. Other related descriptions are similar to the related descriptions in step 302. For details, refer to the related descriptions in step 302, and details are not described herein again.

503. The access management network element sends a request message to the information providing network element.

This step is similar to step 303. For detailed descriptions, refer to related descriptions in step 303, and details are not described herein again.

504. The information providing network element returns an identifier of a cell allowed to be accessed and an identifier of a neighboring cell of the cell allowed to be accessed to the access management network element.

A difference between this step and step 304 lies in that an information providing network element further sends the identifier of the neighboring cell of the cell allowed to be accessed to the access management network element. Other related descriptions are similar to the related descriptions in step 304 and step 406, and details are not described herein again.

505. The access management network element determines, based on the identifier of the current access cell, the identifier of the cell allowed to be accessed, and the identifier of the neighboring cell of the cell allowed to be accessed, whether to allow registration of the terminal device.

This step is similar to step 407. For detailed descriptions, refer to related descriptions in step 407, and details are not described herein again.

Beneficial effects of this embodiment are similar to beneficial effects of the embodiment in FIG. 3, and details are not described herein again.

The network access methods described in FIG. 3 to FIG. 5 are based on that a terminal device learns that a device type of the terminal device is a terminal that is restricted from accessing a cell. When the terminal device cannot predict a device type of the terminal device in advance, another embodiment of the network access method in this application is shown in FIG. 6.

Figure 6:
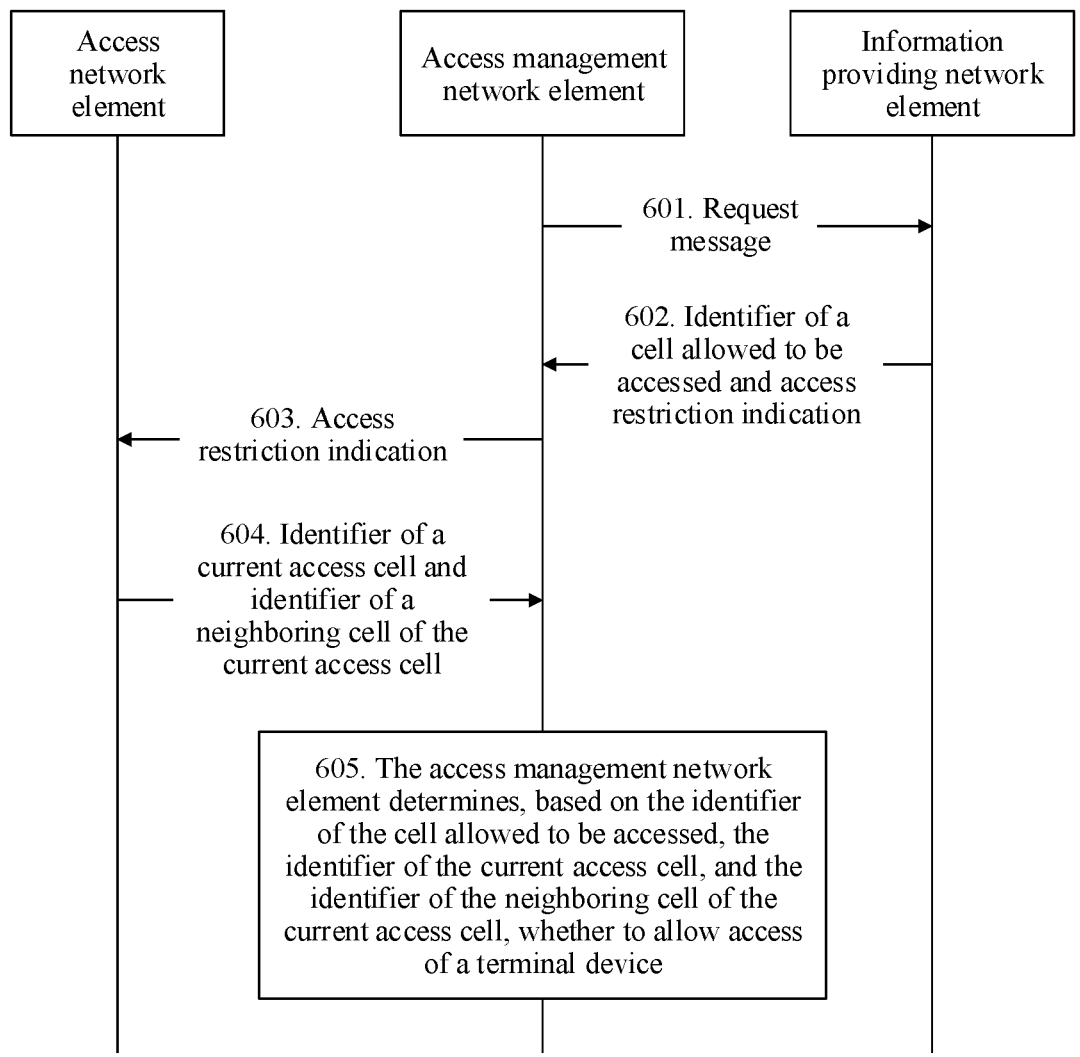
FIG. 6 is a schematic diagram of still another embodiment of a network access method according to an embodiment of this application.

As shown in FIG. 6, another embodiment of a network access method according to an embodiment of this application includes the following steps.

601. An access management network element sends a request message to an information providing network element.

In a registration process of a terminal device, the access management network element sends the request message to the information providing network element, to obtain information about an area allowed to be accessed by the terminal device.

602. The information providing network element returns an identifier of the cell allowed to be accessed to the access management network element and an access restriction indication.

The information providing network element returns the identifier of the cell allowed to be accessed to the access management network element and the access restriction indication, where the access restriction indication is used to indicate that the terminal device is a terminal whose access range is restricted, so that the access management network element learns that the terminal device can access only a cell corresponding to the information about the cell allowed to be accessed.

The cell corresponding to the information about the area allowed to be accessed includes an allowed access cell, and the allowed access cell is a cell that is allowed to be accessed by the terminal device and that is agreed by the terminal device and the information providing network element, to meet a requirement that the terminal device can perform a related service only in a small range. When the terminal device is not in signal coverage of the cell allowed to be accessed, the terminal device cannot access the network. In other words, a network access range of the terminal device is restricted by the cell allowed to be accessed. In addition, correspondingly, as described in FIG. 1, because signal strength of the terminal decreases, the terminal device may be handed over to a neighboring cell of a cell allowed to be accessed. However, an actual location of the terminal device does not change. Therefore, in this case, the terminal device is also allowed to continue to access the network, and the cell allowed to be accessed by the terminal device may include the foregoing neighboring cell of the cell allowed to be accessed.

Optionally, the access restriction indication may be device type information, or may be other information having a similar function. This is not limited in this application. It may be understood that, if the device type indication information is not sent, it may be considered by default that the terminal device is not a terminal restricted to access a cell. Once the device type information is sent, it indicates that the device is a terminal restricted to access the cell. In addition, the device type information may further include device type information of an access-restricted cell and device type information of an access-restricted cell.

It may be understood that the access restriction indication may be filled in the information about the area allowed to be accessed in a process in which a terminal user subscribes to a network operator.

603. The access management network element sends the access restriction indication to the access network element.

After the access management network element learns that the terminal device is a terminal whose access range is restricted, the access management network element sends the access restriction indication of the terminal device to the access network element, to obtain the cell corresponding to the current location of the terminal device.

604. The access network element returns an identifier of a current access cell and an identifier of a neighboring cell of the current access cell to the access management network element.

After the access network element receives the access restriction indication that is of the terminal device and that is sent by the access management network element, the access network element sends the identifier of the current access cell of the terminal device and the identifier of the neighboring cell of the current access cell of the terminal device to the access management network element. The current access cell is obtained by converting the current location of the terminal device.

The neighboring cell of the current access cell may be a cell that is adjacent to the current access cell in location, or may be a cell in a neighboring cell relationship table of the current access cell, where the neighboring cell relationship table is used to indicate a neighboring relationship between cells. If a cell A is located in a neighboring cell relationship table of a cell B, in this case, the cell A is a neighboring cell of the cell B. At the same time, if the cell B is in a neighboring cell relationship table of the cell A, the cell A and the cell B are neighboring cells of each other.

605. The access management network element determines, based on the identifier of the cell allowed to be accessed, the identifier of the current access cell, and the identifier of the neighboring cell of the current access cell, whether to allow registration of the terminal device.

This step is similar to step 305. For details, refer to related descriptions in step 305, and details are not described herein again.

Beneficial effects of this embodiment are similar to beneficial effects of the embodiment in FIG. 3, and details are also not described herein again.

The network access method in this application may be used not only in the foregoing restriction process, but also in a cell handover process of the terminal device. Based on whether a cell after handover is in signal coverage of a same access network element, handover may be classified into intra-base station handover and inter-base station handover.

It should be noted that for a specific handover process, for example, a series of handover operations performed by using an A3 measurement report of the terminal device, refer to records in other related documents. Details are not described in this application. The network access method in this application is also applicable to a cell handover process.

For the intra-base station handover, in a handover process, after the access network element learns of a target cell to which the terminal device is to be handed over, the access management network element needs to re-determine whether the target cell is within a range of a cell allowed to be accessed by the terminal device or a neighboring cell of the cell allowed to be accessed by the terminal device. If yes, the access management network element allows the terminal device to be handed over to the target cell. Otherwise, the terminal device is not allowed to be handed over to the target cell. A specific determining manner is similar to the implementations in FIG. 3 to FIG. 6, and details are not described herein again.

For the inter-base station handover, the network access method in this application is described with reference to FIG. 7.

Figure 7:
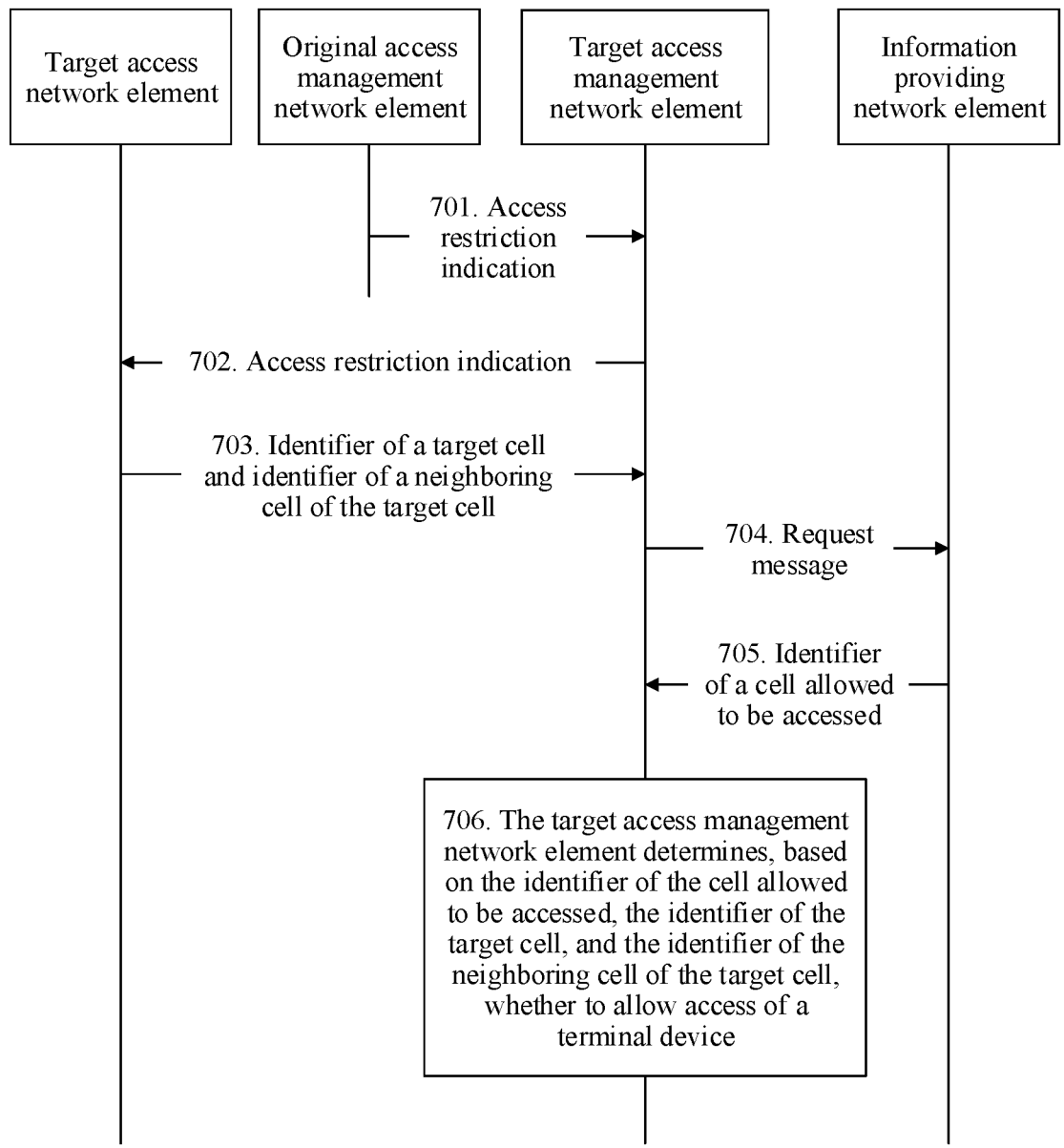
FIG. 7 is a schematic diagram of still another embodiment of a network access method according to an embodiment of this application.

As shown in FIG. 7, another embodiment of a network access method according to an embodiment of this application includes the following steps.

701. An original access management network element sends an access restriction indication to a target access management network element.

In an inter-base station handover process of the terminal device, the original access management network element learns of the target access management network element corresponding to a target cell to which a terminal device is handed over. Herein, the original access management network element is an access management network element corresponding to an original cell in which the terminal device is located before handover. Further, because the terminal device is a terminal whose access range is restricted, in the handover process, the original access management network element sends the access restriction indication of the terminal device to the target access management network element, so that the target access management network element learns that the access range of the terminal device is restricted.

Optionally, the access restriction indication may be device type information, or may be other information having a similar function. This is not limited in this application. It may be understood that, if the device type indication information is not sent, it may be considered by default that the terminal device is not a terminal restricted to access a cell. Once the device type information is sent, it indicates that the device is a terminal restricted to access the cell. In addition, the device type information may further include device type information of an access-restricted cell and device type information of an access-restricted cell.

702. The target access management network element sends the access restriction indication to the target access network element.

After the target access management network element learns that the terminal device is the terminal whose access range is restricted, the target access management network element sends the access restriction indication of the terminal device to the target access network element, to obtain the cell corresponding to the current location of the terminal device.

703. The target access network element returns an identifier of the target cell and an identifier of a neighboring cell of the target cell to the target access management network element.

After the target access network element receives the access restriction indication of the terminal device that is sent by the target access management network element, the target access network element sends, to the target access management network element, the identifier of the target cell to which the terminal device requests handover and the identifier of the neighboring cell of the target cell of the terminal device.

704. The target access management network element sends a request message to an information providing network element.

After the target access management network element learns that the terminal device is the terminal whose access range is restricted, the target access management network element sends the request message to the information providing network element, to obtain cell information corresponding to information about an area allowed to be accessed by the terminal device.

The information that is about the area allowed to be accessed by and that is recorded by the information providing network element is from a subscription process between the terminal device and the information providing network element. For a specific subscription process, refer to descriptions in subsequent FIG. 8 to FIG. 11, and details are not described herein.

705. The information providing network element returns the identifier of the cell allowed to be accessed to the target access management network element.

After the information providing network element receives the request message sent by the target access management network element, the information providing network element returns the identifier of the cell allowed to be accessed by the terminal device to the access management network element, so that the target access management network element learns of the cell range in which the terminal device is restricted to access.

706. The target access management network element determines, based on the identifier of the cell allowed to be accessed, the identifier of the target cell, and the identifier of the neighboring cell of the target cell, whether to allow handover of the terminal device.

The target access management network element determines whether one or more identifiers in the identifier of the target cell and the identifier of the neighboring cell of the target cell are the same as the identifier of the cell allowed to be accessed. If the one or more identifiers are the same as the identifier of the cell allowed to be accessed, the target access management network element allows the terminal device to be handed over to the target cell.

If none of the identifier of the target cell and the identifier of the neighboring cell of the target cell is the same as the identifier of the cell allowed to be accessed, the target access management network element rejects the terminal device to be handed over to the target cell, so that the terminal device cannot be handed over to the target cell, and further cannot perform an operation such as network access by using the target cell.

In this embodiment, for the terminal device whose access range is restricted, in a cell handover process of the terminal device, the terminal device may alternatively be restricted to coverage of the cell allowed to be accessed, to ensure that the terminal device is always within the coverage of the cell allowed to be accessed.

It should be noted that, the network access method in this application described in the corresponding embodiment in FIG. 2 may also be applicable to a session establishment process of the terminal device. For the terminal device whose access range is restricted, the terminal device can establish a session only within a cell corresponding to the information about the area allowed to be accessed, to restrict a network access range of the terminal device.

The location information described in FIG. 3 to FIG. 7 may be any type of information in latitude and longitude information, administrative location information, and address information, and may alternatively be other location information that can reflect a restricted access range of the terminal device. This is not limited in this application.

Figure 8:
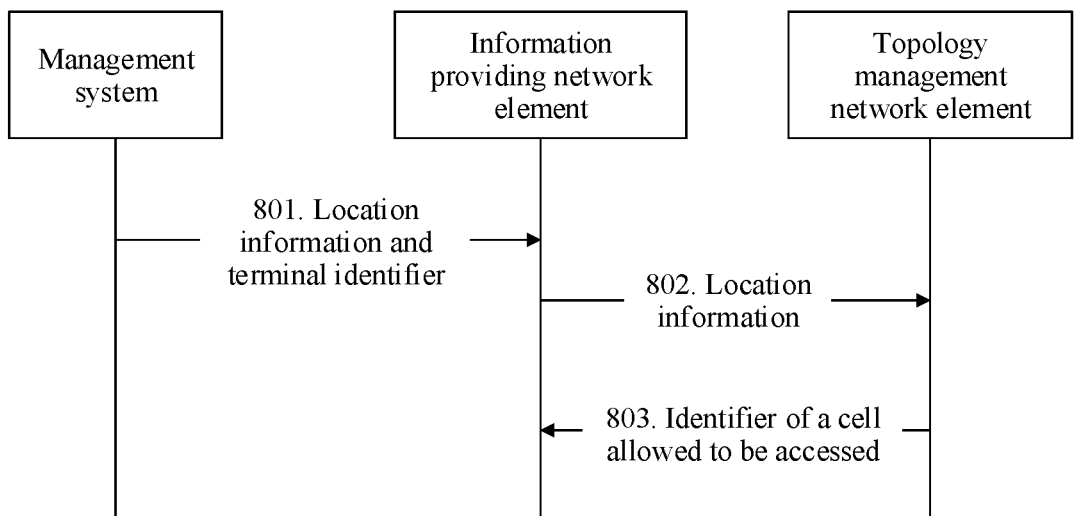
FIG. 8 is a schematic diagram of a subscription manner of a network access method according to an embodiment of this application.

In addition to the embodiments corresponding to FIG. 3 to FIG. 7, this application further provides the following subscription manners corresponding to the network access method, to complete subscription of the terminal device whose access range is restricted. Details are as follows:

As shown in FIG. 8, a subscription manner of a network access method in this application includes the following steps.

801. A management system sends location information of a terminal device and a terminal identifier to an information providing network element.

802. The information providing network element sends the location information of the terminal device to a topology management network element.

803. The topology management network element sends an identifier of a cell allowed to be accessed to the information providing network element.

The topology management network element converts the location information of the terminal device, to obtain an identifier of a cell allowed to be accessed by the terminal device, and sends the identifier of the cell allowed to be accessed to the information providing network element. Finally, the information providing network element stores the terminal identifier and an identifier of a corresponding cell allowed to be accessed.

Figure 9:
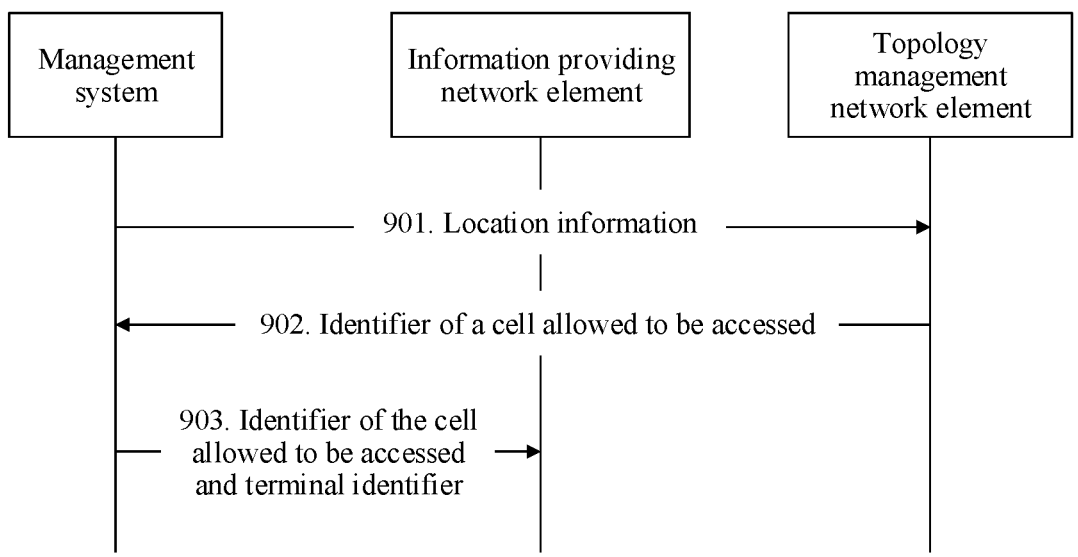
FIG. 9 is a schematic diagram of another subscription manner of a network access method according to an embodiment of this application.

As shown in FIG. 9, another subscription manner of a network access method in this application includes the following steps.

901. A management system sends location information of a terminal device to a topology management network element.

902. The topology management network element sends an identifier of a cell allowed to be accessed to the management system.

The topology management network element converts the location information of the terminal device, to obtain an identifier of a cell allowed to be accessed by the terminal device, and sends the identifier of the cell allowed to be accessed to the management system.

903. The management system sends the identifier of the cell allowed to be accessed and the terminal identifier to the information providing network element.

Finally, the information providing network element stores the terminal identifier and an identifier of a corresponding cell allowed to be accessed.

Figure 10:
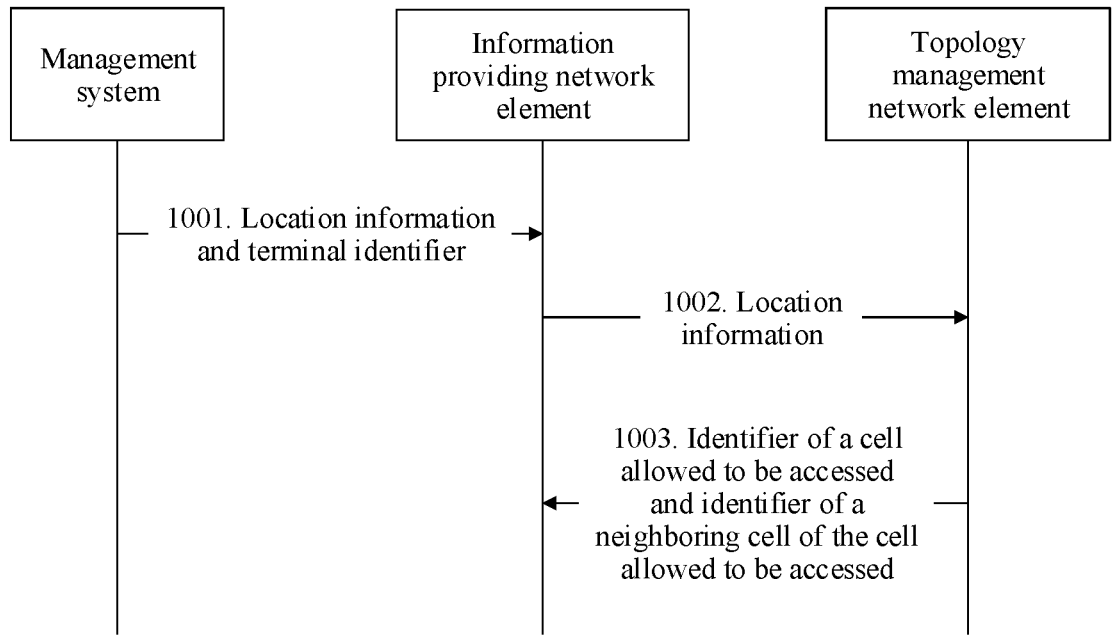
FIG. 10 is a schematic diagram of still another subscription manner of a network access method according to an embodiment of this application.

As shown in FIG. 10, another subscription manner of a network access method in this application includes the following steps.

1001. A management system sends location information of a terminal device and a terminal identifier to an information providing network element.

1002. The information providing network element sends the location information of the terminal device to a topology management network element.

1003. The topology management network element sends an identifier of a cell allowed to be accessed and an identifier of a neighboring cell of the cell allowed to be accessed to the information providing network element.

The topology management network element converts the location information of the terminal device, to obtain an identifier of a cell allowed to be accessed by the terminal device and the identifier of the neighboring cell of the cell allowed to be accessed, and sends the foregoing two types of identifiers to the information providing network element. Finally, the information providing network element stores the terminal identifier and the foregoing two types of identifiers of the terminal device.

Figure 11:
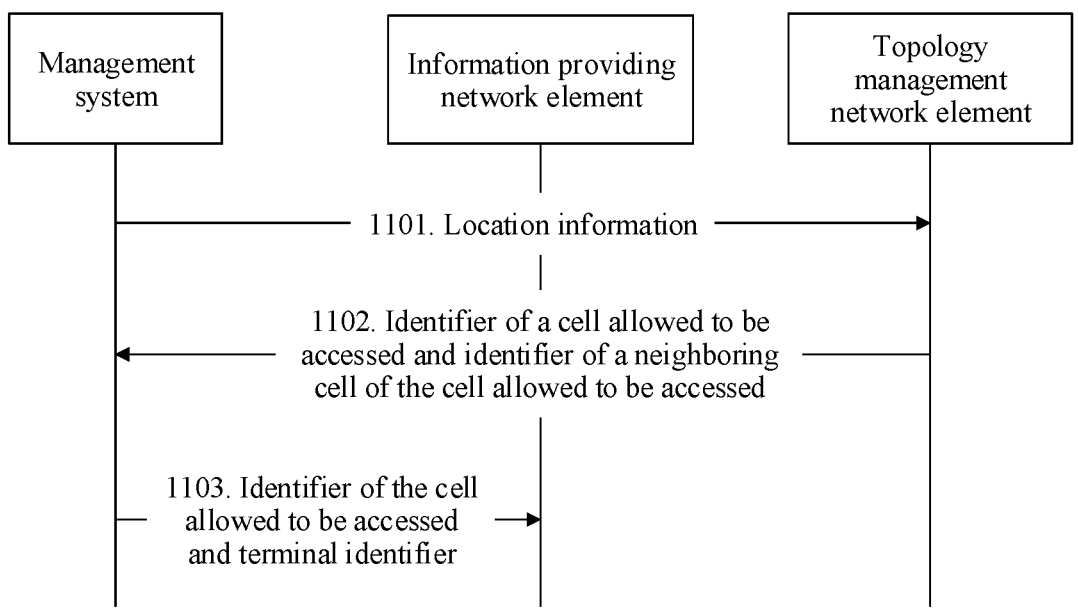
FIG. 11 is a schematic diagram of still another subscription manner of a network access method according to an embodiment of this application.

As shown in FIG. 11, another subscription manner of a network access method in this application includes the following steps.

1101. A management system sends location information of a terminal device to a topology management network element.

1102. The topology management network element sends an identifier of a cell allowed to be accessed and an identifier of a neighboring cell of cell allowed to be accessed to the management system.

The topology management network element converts the location information of the terminal device, to obtain an identifier of a cell allowed to be accessed by the terminal device and an identifier of a neighboring cell of the cell allowed to be accessed by the terminal device, and sends the foregoing two types of identifiers to the management system.

1103. The management system sends the identifier of the cell allowed to be accessed and the terminal identifier to the information providing network element.

Finally, the information providing network element stores the terminal identifier and an identifier of a corresponding cell allowed to be accessed.

The management system corresponding to FIG. 8 to FIG. 11 may be an input system for executing subscription, for example, a system for a subscription staff member to enable a service, or may be another system with a similar function. This is not limited in this application.

Similarly, as described above, the corresponding information providing network element in FIG. 8 to FIG. 11 may be a unified data management network element, a policy control network element, or an authentication network element, or may be another network element having a similar function. This is not limited in this application.

The location information described in FIG. 8 to FIG. 11 may be any type of information in latitude and longitude information, administrative location information, and address information, and may alternatively be other location information that can reflect a restricted access range of the terminal device. This is not limited in this application.

Figure 12:
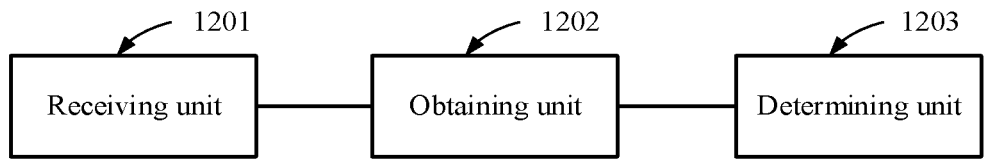
FIG. 12 is a schematic diagram of an embodiment of an access management apparatus according to an embodiment of this application.

The foregoing embodiment describes in detail the network access method in this application. The following describes in detail a network element and a terminal device in this application. Details are as follows:

As shown in FIG. 12, an embodiment of an access management apparatus in this embodiment of this application includes:

a receiving unit 1201, configured to receive information about an area accessed by a terminal device;

an obtaining unit 1202, configured to obtain information about an area allowed to be accessed by the terminal device; and a determining unit 1203, configured to determine, based on the information about the area accessed by the terminal device and the information about the area allowed to be accessed by the terminal device, whether to allow access of the terminal device.

Figure 13:
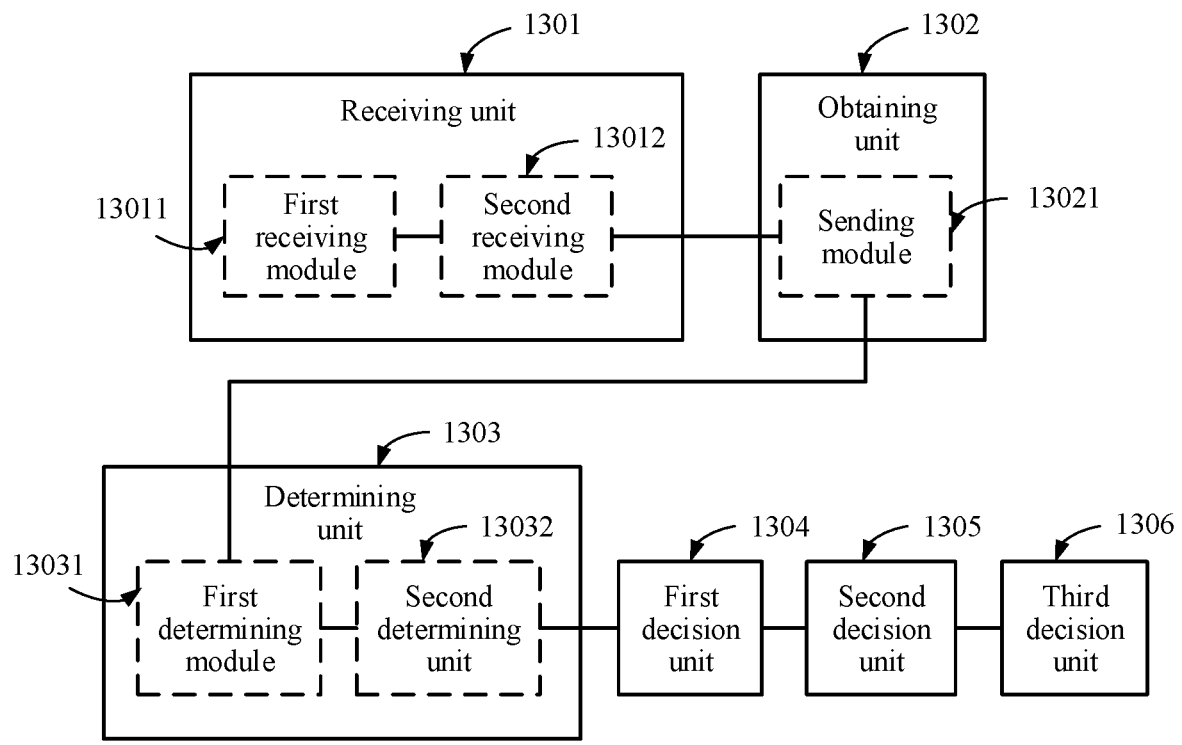
FIG. 13 is a schematic diagram of another embodiment of an access management apparatus according to an embodiment of this application.

As shown in FIG. 13, in a possible implementation of an access management apparatus, a receiving unit 1301 includes:

a first receiving module 13011, configured to receive information that is about an area accessed by a terminal device and that is sent by an access network element, where the information about the area accessed by the terminal device includes: at least one of information about an area currently accessed by the terminal device and information about a neighboring area of the area currently accessed by the terminal device; or a second receiving module 13012, configured to receive the information about the area currently accessed by the terminal device sent by the access network element; and the information about the neighboring area of the area currently accessed by the terminal device sent by a topology management network element is received.

As shown in FIG. 13, in a possible implementation of the access management apparatus, an obtaining unit 1302 includes:

a sending module 13021, configured to receive a request message to an information providing network element, where the request message is used to request the information about the area allowed to be accessed by the terminal device, and the information providing network element includes: a unified device management network element, a policy control network element, or an authentication service network element.

As shown in FIG. 13, in a possible implementation of the access management apparatus, a determining unit 1303 includes:

a first determining unit 13031, configured to determine, based on whether the information about the area allowed to be accessed by the terminal device includes all or a part of the information about the area accessed by the terminal device, whether to allow access of the terminal device.

As shown in FIG. 13, in a possible implementation of the access management apparatus, the determining unit 1303 includes:

a second determining unit 13032, configured to determine, based on whether the verification information of the area accessed by the terminal device matches the verification information of the area allowed to be accessed by the terminal device, whether to allow the access of the terminal device.

As shown in FIG. 13, in a possible implementation of an access management apparatus, the access management apparatus further includes:

a first decision unit 1304, configured to: in a registration process, determine, by the access management network element based on the information about the area accessed by the terminal device and the information about the area allowed to be accessed by the terminal device, that the access of the terminal device is not allowed, and reject registration of the terminal device, or reject establishment of a session connection by the terminal device; or a second decision unit 1305, configured to: in a handover process, determine, by the access management network element based on the information about the area accessed by the terminal device and the information about the area allowed to be accessed by the terminal device, that the access of the terminal device is not allowed, and reject, by the access management network element, handover performed by the terminal device, initiate a deregistration procedure to the terminal device, or initiate a session deletion procedure to the terminal device; or a third decision unit 1306, configured to: in a handover process, determine, by the access management network element based on the information about the area accessed by the terminal device and the information about the area allowed to be accessed by the terminal device, that the access of the terminal device is not allowed, and reject, by the access management network element, handover performed by the terminal device, initiate a deregistration procedure to the terminal device, or initiate a session deletion procedure to the terminal device.

Figure 14:
FIG. 14 is a schematic diagram of an embodiment of an access apparatus according to an embodiment of this application.

As shown in FIG. 14, an embodiment of an access apparatus in this embodiment of this application includes:

an obtaining unit 1401, configured to learn that a terminal device can access only an area allowed to be accessed; and a sending unit 1402, configured to send information about an area accessed by the terminal device to an access management network element.

Figure 15:
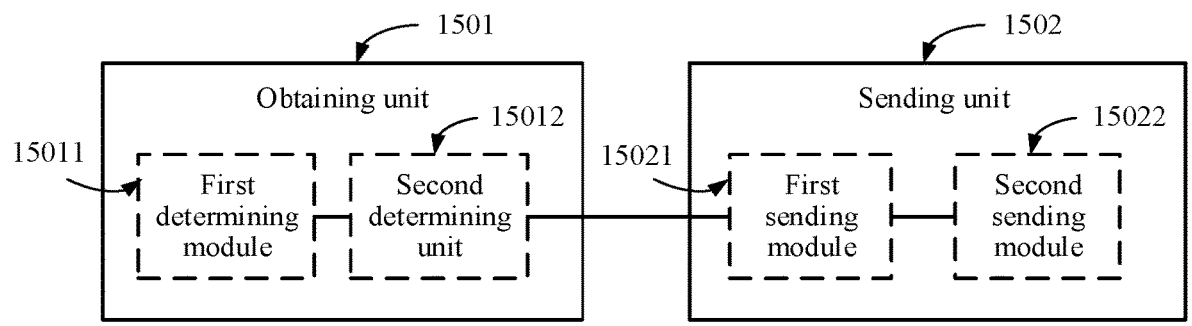
FIG. 15 is a schematic diagram of another embodiment of an access apparatus according to an embodiment of this application.

As shown in FIG. 15, in a possible implementation of an access apparatus, an obtaining unit 1501 includes:

a first determining module 15011, configured to determine, based on an access restriction identifier sent by a terminal device, that the terminal device can access only an area allowed to be accessed; or a second determining unit 15012, configured to determine, based on an indication message sent by the access management network element, that the terminal device can access only the area allowed to be accessed, where the indication message is used to indicate that the access network element sends the information about the area accessed by the terminal device to the access management network element.

As shown in FIG. 15, in a possible implementation of the access apparatus, a sending unit 1502 includes:

a first sending module 15021, configured to send information that is about an area accessed by a terminal device and that is sent by an access management network element, where the information about the area accessed by the terminal device includes: information about an area currently accessed by the terminal device and information about a neighboring area of an area currently accessed by the terminal device; or a second sending module 15022, configured to send only information about an area currently accessed by the terminal device to the access management network element.

Figure 16:
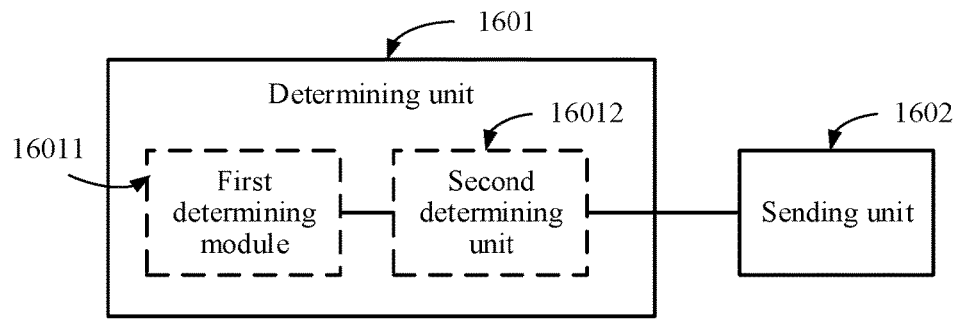
FIG. 16 is a schematic diagram of an embodiment of a terminal device according to an embodiment of this application.

As shown in FIG. 16, an embodiment of a terminal device in this embodiment of this application includes:

a determining unit 1601, configured to determine that the terminal device can access only an area allowed to be accessed; and a sending unit 1602, configured to send indication information to an access network element, where the indication information is used to indicate that the access network element sends information about an area accessed by the terminal device to an access management network element.

In a possible implementation of the terminal device, the determining unit 1601 includes:

a first determining module 16011, configured to determine, based on a device type of the terminal device, that the terminal device can access only the area allowed to be accessed; or a second determining module 16012, configured to determine, based on subscription information of the terminal device, that the terminal device can access only the area allowed to be accessed.

Figure 17:
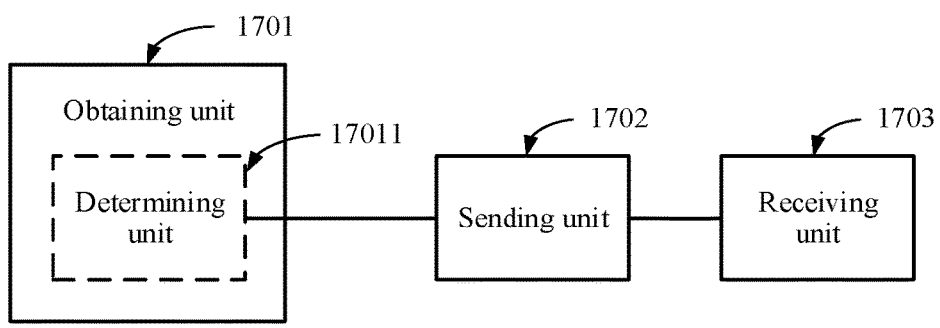
FIG. 17 is a schematic diagram of an embodiment of an information providing apparatus according to an embodiment of this application.

As shown in FIG. 17, an embodiment of an information recording apparatus in this embodiment of this application includes:

an obtaining unit 1701, configured to obtain information about an area allowed to be accessed by a terminal device; and a sending unit 1702, configured to send information about the area allowed to be accessed by the terminal device to an access management network element.

In a possible implementation of an access apparatus, the obtaining unit 1701 includes a determining module 17011, configured to determine, based on subscription information of the terminal device, the information about the area allowed to be accessed by the terminal device.

In a possible implementation of the access apparatus, the information recording apparatus further includes: a receiving unit 1703, configured to receive a request message sent by an access management network element, where the request message is used by an information providing apparatus to send the information about the area allowed to be accessed by the terminal device.

The access management apparatus, the access apparatus, the terminal device, and the information providing network element in this application are further configured to perform the method embodiments in FIG. 2 to FIG. 7, to implement the network access method in this application. The access management apparatus is configured to perform an operation performed by the access management network element, the access apparatus is configured to perform an operation performed by the access network element, and the information providing network element is configured to perform an operation performed by the information providing network element. For detailed descriptions, refer to related descriptions and beneficial effects in FIG. 2 to FIG. 7, and details are not described herein again.

It should be noted that the information about the area accessed by the terminal device in any one of the access management apparatus, the access apparatus, the information providing apparatus, and the terminal device includes at least one of an identifier of the area accessed by the terminal device, an identifier of a neighboring area of the area accessed by the terminal device, and verification information of the area accessed by the terminal device.

The information about the area allowed to be accessed by the terminal device includes: at least one of an identifier of the area allowed to be accessed by the terminal device and verification information of the area allowed to be accessed by the terminal device.

The identifier of the area accessed by the terminal device includes: any one of an identifier of an access cell, an identifier of an access network device, an interface line identifier, a virtual local area network identifier, and a port identifier; and the identifier of the neighboring area of the area accessed by the terminal device includes: an identifier of a neighboring cell of the access cell or an identifier of a neighboring access network device of the access network device.

Figure 18:
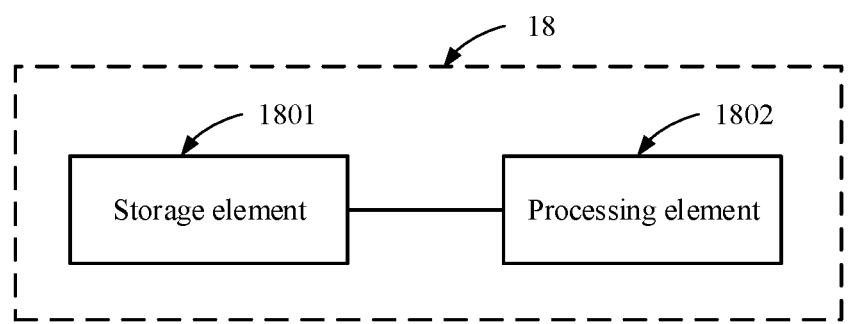
FIG. 18 is a schematic diagram of an embodiment of a communications apparatus according to an embodiment of this application.

As shown in FIG. 18, an embodiment of this application further provides a communications apparatus 18. The communications apparatus 18 includes a storage element 1801 and a processing element 1802. The storage element 1801 is configured to store a computer operation instruction, and the processing element 1802 invokes the computer operation instruction, to perform the operations performed by any one of the access management network element, the access network element, the information providing network element, and the terminal device in the foregoing network access methods in FIG. 2 to FIG. 7. The storage element 1801 includes a memory or a chip having a storage function. In addition, the foregoing memory may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, and a Blu-ray disc, or the like), a magnetic disk storage medium or another magnetic storage device, or any other medium that can be used to carry or store expected program code in a form of an instruction or a data structure and that can be accessed by a computer. However, the memory is not limited thereto. The memory may exist independently, and is connected to the processor by using the bus. The memory may alternatively be integrated with the processor.

The foregoing processing element 1802 includes a processor or a chip having a processing capability. The processor may be a general-purpose central processing unit (CPU), a microprocessor, an application-specific integrated circuit (ASIC)), or one or more integrated circuits configured to control program execution in the solutions of this application.

The foregoing communications apparatus 18 may further include a communications interface and a communications line. The communications interface is configured to establish a network connection to another device. The communications line is a channel, and is used to transmit information between the memory, the processor, and the communications interface, to implement the network access methods according to any one of FIG. 2 to FIG. 7 in this application.

During specific implementation, in an embodiment, the communications apparatus may further include an output device and an input device. When communicating with the processor, the output device may display information in a plurality of manners. For example, the output device may be a liquid crystal display (LCD), a light emitting diode (LED) display device, a cathode ray tube (CRT) display device, a projector, or the like. When communicating with the processor, the input device may receive input of a user in a plurality of manners. For example, an input device may be a mouse, a keyboard, a touchscreen device, or a sensing device.

The foregoing communications apparatus may be a general-purpose device or a special-purpose device. During specific implementation, the communications device may be a desktop computer, a portable computer, a network server, a personal digital assistant (PDA), a mobile phone, a tablet computer, a wireless terminal device, an embedded device, or a device with a structure similar to that in FIG. 3. A type of the communications device is not limited in this embodiment of this application.

An embodiment of this application further provides a computer storage medium. The computer storage medium is configured to store a computer operation instruction. When the computer operation instruction is run on a computer, the computer is enabled to perform the network access methods according to any one of the access management network element, the information providing network element, the access network element, and the terminal device. Specifically, the computer storage medium may be the corresponding storage chip or memory in FIG. 16.

An embodiment of this application further provides a computer program product. When the computer program product is run on a computer, the computer is enabled to perform the operations performed, in the foregoing network access methods in FIG. 2 to FIG. 7, by any device of the access management network element, the access network element, the information providing network element, and the terminal device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A network access method, comprising:
    receiving, by an access management network element, information about an area accessed by a terminal device;
    obtaining, by the access management network element, information about an area allowed to be accessed by the terminal device, wherein the area allowed to be accessed by the terminal device is controlled by the access management network element within a preset range based on a requirement of a service; and
    determining, by the access management network element based on the information about the area accessed by the terminal device and the information about the area allowed to be accessed by the terminal device, whether to allow access by the terminal device,
    wherein the information about the area allowed to be accessed by the terminal device comprises:
        at least one of an identifier of the area allowed to be accessed by the terminal device, an identifier of a neighboring area of the area accessed by the terminal device, and verification information of the area allowed to be accessed by the terminal device;
    wherein the identifier of the area accessed by the terminal device comprises:
        one or more of an identifier of an access cell, an identifier of an access network device, an interface line identifier, a virtual local area network identifier, and a port identifier; and
    wherein the identifier of the neighboring area of the area accessed by the terminal device comprises:
        an identifier of a neighboring cell of the access cell or an identifier of a neighboring access network device of the access network device.

2. The method according to claim 1, wherein the information about the area allowed to be accessed by the terminal device comprises:
    at least one of an identifier of the area allowed to be accessed by the terminal device and verification information of the area allowed to be accessed by the terminal device.

3. The method according to claim 1, wherein the receiving, by the access management network element, information about the area accessed by the terminal device comprises:
    receiving, by the access management network element, the information about the area accessed by the terminal device sent from an access network element,
    wherein the information about the area accessed by the terminal device comprises: at least one of information about an area currently accessed by the terminal device and information about a neighboring area of the area currently accessed by the terminal device.

4. The method according to claim 1, wherein the receiving, by the access management network element, information about the area accessed by the terminal device comprises:
    receiving, by the access management network element, the information about the area currently accessed by the terminal device sent from an access network element; and
    receiving, by the access management network element, information about a neighboring area of the area currently accessed by the terminal device sent from a topology management network element.

5. The method according to claim 1, wherein the obtaining, by the access management network element, information about the area allowed to be accessed by the terminal device comprises:
    sending, by the access management network element, a request message to an information providing network element,
    wherein the request message is used to request the information about the area allowed to be accessed by the terminal device, and
    the information providing network element comprises: a unified device management network element, a policy control network element, or an authentication service network element.

6. The method according to claim 1, wherein the determining, by the access management network element based on the information about the area accessed by the terminal device and the information about the area allowed to be accessed by the terminal device, whether to allow access of the terminal device comprises:
    determining, by the access management network element based on whether the information about the area allowed to be accessed by the terminal device comprises all or a part of the information about the area accessed by the terminal device, whether to allow the access of the terminal device.

7. The method according to claim 1, wherein the determining, by the access management network element based on the information about the area accessed by the terminal device and the information about the area allowed to be accessed by the terminal device, whether to allow access of the terminal device comprises:
determining, by the access management network element based on whether verification information of the area accessed by the terminal device matches verification information of the area allowed to be accessed by the terminal device, whether to allow the access of the terminal device.

8. The method according to claim 1, wherein the method further comprises:
in a session establishment process, determining, by the access management network element based on the information about the area accessed by the terminal device and the information about the area allowed to be accessed by the terminal device, that the access of the terminal device is not allowed; and
rejecting, by the access management network element, establishment of a session connection by the terminal device, and initiating a deregistration procedure of the terminal device, or initiating a session deletion procedure of the terminal device.

9. The method according to claim 1, wherein the method further comprises:
in a registration process, determining, by the access management network element based on the information about the area accessed by the terminal device and the information about the area allowed to be accessed by the terminal device, that the access of the terminal device is not allowed; and
rejecting, by the access management network element, registration of the terminal device, or rejecting establishment of a session connection by the terminal device.

10. The method according to claim 1, wherein the method further comprises:
in a handover process, determining, by the access management network element based on the information about the area accessed by the terminal device and the information about the area allowed to be accessed by the terminal device, that the access of the terminal device is not allowed; and
rejecting, by the access management network element, handover performed by the terminal device, and initiating a deregistration procedure of the terminal device, or initiating a session deletion procedure of the terminal device.

11. An apparatus, comprising:
at least one processor coupled with a memory, wherein the at least one processor is configured to execute instructions stored in the memory, to cause the apparatus to perform the following operations:
receiving information about an area accessed by a terminal device;
obtaining information about an area allowed to be accessed by the terminal device, wherein the area allowed to be accessed by the terminal device is controlled by an access management network element within a preset range based on a requirement of a service; and
determining, based on the information about the area accessed by the terminal device and the information about the area allowed to be accessed by the terminal device, whether to allow access by the terminal device,
wherein the information about the area allowed to be accessed by the terminal device comprises:
at least one of an identifier of the area allowed to be accessed by the terminal device, an identifier of a neighboring area of the area accessed by the terminal device, and verification information of the area allowed to be accessed by the terminal device;
wherein the identifier of the area accessed by the terminal device comprises:
one or more of an identifier of an access cell, an identifier of an access network device, an interface line identifier, a virtual local area network identifier, and a port identifier; and
wherein the identifier of the neighboring area of the area accessed by the terminal device comprises:
an identifier of a neighboring cell of the access cell or an identifier of a neighboring access network device of the access network device.

12. The apparatus according to claim 11, wherein the receiving information about the area accessed by the terminal device comprises:
receiving the information about the area accessed by the terminal device sent from an access network element, wherein the information about the area accessed by the terminal device comprises: at least one of information about an area currently accessed by the terminal device and information about a neighboring area of the area currently accessed by the terminal device.

13. The apparatus according to claim 11, wherein the receiving information about the area accessed by the terminal device comprises:
receiving information about an area currently accessed by the terminal device sent from an access network element; and
receiving information about a neighboring area of the area currently accessed by the terminal device sent from a topology management network element.

14. The apparatus according to claim 11, wherein the obtaining information about the area allowed to be accessed by the terminal device comprises:
sending a request message to an information providing network element,
wherein the request message is used to request the information about the area allowed to be accessed by the terminal device, and the information providing network element comprises: a unified device management network element, a policy control network element, or an authentication service network element.

15. The apparatus according to claim 11, wherein the determining, based on the information about the area accessed by the terminal device and the information about the area allowed to be accessed by the terminal device, whether to allow access of the terminal device comprises:
determining, based on whether the information about the area allowed to be accessed by the terminal device comprises all or a part of the information about the area accessed by the terminal device, whether to allow the access of the terminal device.

16. The apparatus according to claim 11, wherein the determining, based on the information about the area accessed by the terminal device and the information about the area allowed to be accessed by the terminal device, whether to allow access of the terminal device comprises:

determining, based on whether verification information of the area accessed by the terminal device matches verification information of the area allowed to be accessed by the terminal device, whether to allow the access of the terminal device.

17. The apparatus according to claim 11, wherein the at least one processor is configured to execute instructions stored in the memory, to cause the apparatus to further perform the following operations:
in a session establishment process, determining, based on the information about the area accessed by the terminal device and the information about the area allowed to be accessed by the terminal device, that the access of the terminal device is not allowed; and
rejecting establishment of a session connection by the terminal device, and initiating a deregistration procedure of the terminal device, or initiating a session deletion procedure of the terminal device.

18. A non-transitory computer-readable medium, having computer-executable instructions stored thereon, wherein the computer-executable instructions, when executed by one or more processors, cause the one or more processors to facilitate:
receiving, by an access management network element, information about an area accessed by a terminal device;
obtaining, by the access management network element, information about an area allowed to be accessed by the terminal device, wherein the area allowed to be accessed by the terminal device is controlled by the access management network element within a preset range based on a requirement of a service; and
determining, by the access management network element based on the information about the area accessed by the terminal device and the information about the area allowed to be accessed by the terminal device, whether to allow access by the terminal device,
wherein the information about the area allowed to be accessed by the terminal device comprises:
at least one of an identifier of the area allowed to be accessed by the terminal device, an identifier of a neighboring area of the area accessed by the terminal device, and verification information of the area allowed to be accessed by the terminal device;
wherein the identifier of the area accessed by the terminal device comprises:
one or more of an identifier of an access cell, an identifier of an access network device, an interface line identifier, a virtual local area network identifier, and a port identifier; and
wherein the identifier of the neighboring area of the area accessed by the terminal device comprises:
an identifier of a neighboring cell of the access cell or an identifier of a neighboring access network device of the access network device.

19. A method, comprising:
sending, by an access network element, information about an area accessed by a terminal device;
receiving, by an access management network element, information about the area accessed by a terminal device;
obtaining, by the access management network element, information about an area allowed to be accessed by the terminal device, wherein the area allowed to be accessed by the terminal device is controlled by the access management network element within a preset range based on a requirement of a service; and
determining, by the access management network element based on the information about the area accessed by the terminal device and the information about the area allowed to be accessed by the terminal device, whether to allow access by the terminal device
wherein the information about the area allowed to be accessed by the terminal device comprises:
at least one of an identifier of the area allowed to be accessed by the terminal device, an identifier of a neighboring area of the area accessed by the terminal device, and verification information of the area allowed to be accessed by the terminal device;
wherein the identifier of the area accessed by the terminal device comprises:
one or more of an identifier of an access cell, an identifier of an access network device, an interface line identifier, a virtual local area network identifier, and a port identifier; and
wherein the identifier of the neighboring area of the area accessed by the terminal device comprises:
an identifier of a neighboring cell of the access cell or an identifier of a neighboring access network device of the access network device.

20. A system, comprising:
an access network element, configured to send information about an area accessed by a terminal device; and
an access management element, configured to:
receive information about the area accessed by a terminal device;
obtain, by the access management network element, information about an area allowed to be accessed by the terminal device, wherein the area allowed to be accessed by the terminal device is controlled by the access management network element within a preset range based on a requirement of a service; and
determine, by the access management network element based on the information about the area accessed by the terminal device and the information about the area allowed to be accessed by the terminal device, whether to allow access by the terminal device
wherein the information about the area allowed to be accessed by the terminal device comprises:
at least one of an identifier of the area allowed to be accessed by the terminal device, an identifier of a neighboring area of the area accessed by the terminal device, and verification information of the area allowed to be accessed by the terminal device;
wherein the identifier of the area accessed by the terminal device comprises:
one or more of an identifier of an access cell, an identifier of an access network device, an interface line identifier, a virtual local area network identifier, and a port identifier; and
wherein the identifier of the neighboring area of the area accessed by the terminal device comprises:
an identifier of a neighboring cell of the access cell or an identifier of a neighboring access network device of the access network device.

* * * * *